US012613991B2

(12) United States Patent
Bachmann et al.

(10) Patent No.: US 12,613,991 B2
(45) Date of Patent: Apr. 28, 2026

(54) CREDENTIAL TO GUARANTEE IDENTITY

(71) Applicant: CVS PHARMACY, INC., Woonsocket, RI (US)

(72) Inventors: Alan Bachmann, Cranberry Township, GA (US); Mayurkumar Mevada, Hanover Park, IL (US); Brian J. Gamage, Canton, GA (US)

(73) Assignee: CVS Pharmacy, Inc., Woonsocket, RI (US)

( * ) Notice: Subject to any disclaimer, the term of this patent is extended or adjusted under 35 U.S.C. 154(b) by 27 days.

(21) Appl. No.: 18/533,157

(22) Filed: Dec. 7, 2023

(65) Prior Publication Data

US 2025/0190616 A1 Jun. 12, 2025

(51) Int. Cl.
*G06F 21/62* (2013.01)

(52) U.S. Cl.
CPC ................................. *G06F 21/6245* (2013.01)

(58) Field of Classification Search
CPC ... G06F 21/6245; H04L 9/50; H04L 2209/88; H04L 9/3239; G16H 10/60
See application file for complete search history.

(56) References Cited

U.S. PATENT DOCUMENTS

| | | | | |
|---|---|---|---|---|
| 5,991,399 A * | 11/1999 | Graunke | .......... | G11B 20/00086 |
| | | | | 713/168 |
| 6,735,313 B1 * | 5/2004 | Bleichenbacher | ............................ | |
| | | | | H04N 21/4405 |
| | | | | 348/E7.056 |

| | | | | |
|---|---|---|---|---|
| 7,051,005 B1 * | 5/2006 | Peinado | .............. | H04L 63/0442 |
| | | | | 713/193 |
| 7,093,129 B1 * | 8/2006 | Gavagni | .............. | H04L 9/3263 |
| | | | | 713/153 |
| 7,698,430 B2 * | 4/2010 | Jackson | .................. | H04L 47/83 |
| | | | | 718/104 |
| 7,730,365 B1 * | 6/2010 | Belady | .................. | G06F 9/5011 |
| | | | | 714/47.1 |
| 7,802,111 B1 * | 9/2010 | Tahan | ..................... | G06F 21/57 |
| | | | | 713/193 |
| 8,046,767 B2 * | 10/2011 | Rolia | ..................... | G06Q 10/06 |
| | | | | 709/224 |
| 8,213,620 B1 * | 7/2012 | Sussland | .............. | H04L 9/0894 |
| | | | | 380/278 |
| 8,245,235 B1 * | 8/2012 | Belady | .................. | G06F 11/008 |
| | | | | 714/1 |

(Continued)

*Primary Examiner* — David Garcia Cervetti
(74) *Attorney, Agent, or Firm* — Foley & Lardner LLP

(57) ABSTRACT

A system can include one or more memory devices storing instructions thereon, that, when executed by one or more processors, cause the one or more processors to receive a selection of at least one type of private information of a plurality of types of private information of a health provider from a computing system of the health provider. The instructions can cause the one or more processors to receive private information of the type from the computing system. The instructions can cause the one or more processors to issue a credential that guarantees an identify of the health provider based on the type selected and a verification of the private information. The instructions can cause the one or more processors to add the credential to a credential store of the computing system, the credential store to verify the identity of the health provider with a plurality of applications.

20 Claims, 6 Drawing Sheets

(56) References Cited

U.S. PATENT DOCUMENTS

| | | | | |
|---|---|---|---|---|
| 8,245,270 B2* | 8/2012 | Cooperstein | G06F 21/53 | 713/168 |
| 8,250,581 B1* | 8/2012 | Blanding | G06F 9/5011 | 718/103 |
| 8,255,915 B1* | 8/2012 | Blanding | G06F 9/5027 | 709/224 |
| 8,391,494 B1* | 3/2013 | Serenyi | H04L 63/0428 | 380/278 |
| 8,583,911 B1* | 11/2013 | Miller | H04L 63/0428 | 713/150 |
| 8,667,569 B2* | 3/2014 | Tesch | G06F 21/45 | 713/182 |
| 8,719,590 B1* | 5/2014 | Faibish | G06F 21/602 | 713/190 |
| 8,762,712 B1* | 6/2014 | Kwan | H04L 9/0825 | 713/165 |
| 8,838,974 B2* | 9/2014 | Webb | G06F 21/51 | 713/168 |
| 8,843,750 B1* | 9/2014 | Sokolov | H04L 63/0823 | 713/175 |
| 8,966,581 B1* | 2/2015 | Gross | G06F 21/34 | 726/4 |
| 8,984,285 B1* | 3/2015 | Dorwin | H04L 63/06 | 713/151 |
| 9,077,525 B2* | 7/2015 | Chandran | H04L 9/088 | |
| 9,094,206 B2* | 7/2015 | Di Crescenzo | H04L 9/3073 | |
| 9,141,769 B1* | 9/2015 | Hitchcock | H04L 9/0877 | |
| 9,189,609 B1* | 11/2015 | Antony | G06F 21/10 | |
| 9,225,690 B1* | 12/2015 | Fitch | H04L 63/04 | |
| 9,246,690 B1* | 1/2016 | Roth | G06F 21/53 | |
| 9,251,334 B1* | 2/2016 | Molitor | H04L 9/3271 | |
| 9,367,697 B1* | 6/2016 | Roth | H04L 9/0897 | |
| 9,385,872 B2* | 7/2016 | Camenisch | H04L 9/0897 | |
| 9,515,996 B1* | 12/2016 | Juels | H04L 63/0428 | |
| 9,584,517 B1* | 2/2017 | Roth | G06F 21/602 | |
| 9,608,993 B1* | 3/2017 | Camenisch | H04W 12/082 | |
| 9,652,631 B2* | 5/2017 | Novak | H04L 9/3247 | |
| 9,684,542 B2* | 6/2017 | Franco | H04L 67/1097 | |
| 9,690,920 B2* | 6/2017 | Marcus | H04L 63/0815 | |
| 9,690,941 B2* | 6/2017 | Thom | G06F 21/6209 | |
| 9,692,741 B1* | 6/2017 | Vilhuber | H04L 63/0823 | |
| 9,754,116 B1* | 9/2017 | Roth | G06F 21/602 | |
| 9,767,271 B2* | 9/2017 | Ghose | G06F 21/52 | |
| 9,768,962 B2* | 9/2017 | Acar | H04L 9/3226 | |
| 9,785,489 B1* | 10/2017 | Chheda | G06F 9/45558 | |
| 9,887,836 B1* | 2/2018 | Roth | H04L 9/088 | |
| 9,910,997 B1* | 3/2018 | Brail | G06F 21/44 | |
| 10,079,681 B1* | 9/2018 | Roth | H04L 67/10 | |
| 10,187,363 B2* | 1/2019 | Smirnoff | H04L 9/0897 | |
| 10,554,475 B2* | 2/2020 | Weinstein | G06F 21/53 | |
| 10,757,082 B2* | 8/2020 | Buendgen | H04L 9/0897 | |
| 10,783,237 B2* | 9/2020 | Chen | G06Q 10/00 | |
| 11,159,419 B1* | 10/2021 | Roersma | H04L 41/0803 | |
| 11,283,858 B2* | 3/2022 | Eder | H04L 67/10 | |
| 11,546,358 B1* | 1/2023 | Robinson | H04L 63/205 | |
| 11,606,217 B2* | 3/2023 | Grainger | H04L 9/3268 | |
| 11,736,290 B1* | 8/2023 | Dods | H04L 9/50 | |
| 11,741,216 B1* | 8/2023 | Dods | H04L 9/0891 | 713/189 |
| 11,748,492 B1* | 9/2023 | Campagna | H04L 9/0637 | 713/150 |
| 11,757,857 B2* | 9/2023 | Yamamoto | H04L 9/3268 | 726/6 |
| 11,836,242 B2* | 12/2023 | Graff | H04L 63/0861 | 713/168 |
| 11,848,754 B1* | 12/2023 | Dods | H04L 9/0891 | |
| 12,015,720 B2* | 6/2024 | Wagner | H04L 9/3066 | |
| 12,028,339 B2* | 7/2024 | Richardson, IV | H04L 63/0876 | |
| 12,229,302 B1* | 2/2025 | Panwar | H04L 9/3239 | |
| 12,309,303 B2* | 5/2025 | Li | H04L 9/50 | |
| 2002/0023212 A1* | 2/2002 | Proudler | H04L 63/08 | 714/E11.204 |
| 2002/0162104 A1* | 10/2002 | Raike | H04L 9/083 | 380/282 |
| 2003/0194085 A1* | 10/2003 | Dillaway | G06F 21/6209 | 380/29 |
| 2004/0025036 A1* | 2/2004 | Balard | G06F 21/575 | 713/176 |
| 2004/0255137 A1* | 12/2004 | Ying | H04L 63/0884 | 713/193 |
| 2005/0069138 A1* | 3/2005 | de Jong | G06F 9/3017 | 380/278 |
| 2005/0086479 A1* | 4/2005 | Ondet | G06F 21/10 | 713/172 |
| 2005/0114683 A1* | 5/2005 | Jin | G06F 21/14 | 713/187 |
| 2006/0031301 A1* | 2/2006 | Herz | G06F 21/6254 | 709/206 |
| 2006/0056297 A1* | 3/2006 | Bryson | H04L 63/104 | 370/230 |
| 2006/0123461 A1* | 6/2006 | Lunt | G06F 21/6254 | 726/1 |
| 2006/0143495 A1* | 6/2006 | Bozak | G06F 9/5061 | 714/4.1 |
| 2006/0156391 A1* | 7/2006 | Salowey | H04L 63/20 | 726/5 |
| 2007/0040021 A1* | 2/2007 | Nakayma | G06F 12/1408 | 235/382 |
| 2007/0086586 A1* | 4/2007 | Jakubowski | H04L 9/002 | 380/28 |
| 2007/0160203 A1* | 7/2007 | Sudhakar | H04L 9/3263 | 380/30 |
| 2008/0046960 A1* | 2/2008 | Bade | G06F 9/5027 | 726/1 |
| 2008/0056501 A1* | 3/2008 | McGough | H04L 63/08 | 380/282 |
| 2008/0063201 A1* | 3/2008 | Wormald | H04L 63/0823 | 380/255 |
| 2008/0065886 A1* | 3/2008 | McGough | H04L 63/061 | 713/168 |
| 2008/0072230 A1* | 3/2008 | Jackson | G06F 9/542 | 718/104 |
| 2008/0072284 A1* | 3/2008 | Horvitz | G06F 21/6245 | 726/2 |
| 2008/0080708 A1* | 4/2008 | McAlister | H04L 9/0844 | 380/44 |
| 2008/0152144 A1* | 6/2008 | Douguet | H04L 9/3236 | 380/277 |
| 2008/0181412 A1* | 7/2008 | Acar | G06F 21/79 | 380/279 |
| 2008/0192937 A1* | 8/2008 | Challener | H04L 9/14 | 380/278 |
| 2008/0229117 A1* | 9/2008 | Shin | G06F 21/72 | 713/190 |
| 2008/0232598 A1* | 9/2008 | Vennelakanti | G06F 21/62 | 380/279 |
| 2008/0301470 A1* | 12/2008 | Green | G06F 21/6218 | 713/193 |
| 2008/0313743 A1* | 12/2008 | Chan | G06F 21/105 | 726/28 |
| 2009/0097660 A1* | 4/2009 | Malaviarachchi | G06Q 20/3829 | 380/279 |
| 2009/0103726 A1* | 4/2009 | Ahmed | H04L 9/12 | 380/46 |
| 2009/0138708 A1* | 5/2009 | Miyazaki | H04L 63/04 | 713/168 |
| 2009/0150681 A1* | 6/2009 | Kaabouch | H04L 9/14 | 713/193 |
| 2009/0158035 A1* | 6/2009 | Stultz | H04L 63/0442 | 713/160 |
| 2009/0169013 A1* | 7/2009 | Fascenda | G06F 21/72 | 380/277 |
| 2009/0205018 A1* | 8/2009 | Ferraiolo | H04L 63/102 | 707/999.103 |
| 2009/0235324 A1* | 9/2009 | Griffin | G06F 21/629 | 726/1 |
| 2009/0296941 A1* | 12/2009 | Devanand | H04L 63/0428 | 380/281 |

(56)　　　　　References Cited

U.S. PATENT DOCUMENTS

| | | | |
|---|---|---|---|
| 2010/0043068 A1* | 2/2010 | Varadhan | H04L 45/50 726/15 |
| 2010/0058047 A1* | 3/2010 | Medvinsky | H04L 9/321 713/189 |
| 2010/0082987 A1* | 4/2010 | Thom | G06F 21/34 713/171 |
| 2010/0083002 A1* | 4/2010 | Cui | G06F 21/575 713/189 |
| 2010/0146292 A1* | 6/2010 | Shi | H04L 9/3263 713/189 |
| 2010/0146293 A1* | 6/2010 | Shi | G06F 21/10 713/189 |
| 2010/0146501 A1* | 6/2010 | Wyatt | G06F 21/84 718/1 |
| 2010/0162383 A1* | 6/2010 | Linden | G06F 11/2028 726/13 |
| 2010/0174919 A1* | 7/2010 | Ito | G06F 21/74 713/192 |
| 2010/0223456 A1* | 9/2010 | Schneider | H04L 63/0428 380/277 |
| 2010/0318786 A1* | 12/2010 | Douceur | H04L 63/123 713/155 |
| 2011/0010547 A1* | 1/2011 | Noda | H04L 9/321 713/168 |
| 2011/0085667 A1* | 4/2011 | Berrios | H04L 9/3249 709/203 |
| 2011/0093705 A1* | 4/2011 | Liu | G06F 21/6272 713/168 |
| 2011/0126275 A1* | 5/2011 | Anderson | H04L 63/14 726/8 |
| 2011/0153824 A1* | 6/2011 | Chikando | G06F 9/5088 718/100 |
| 2011/0179268 A1* | 7/2011 | Strom | H04L 9/3247 713/168 |
| 2011/0213869 A1* | 9/2011 | Korsunsky | G06F 21/55 709/223 |
| 2011/0219447 A1* | 9/2011 | Horovitz | G06F 21/566 726/22 |
| 2011/0238855 A1* | 9/2011 | Korsunsky | H04L 63/1441 709/231 |
| 2011/0261964 A1* | 10/2011 | Kahler | H04L 9/083 380/44 |
| 2011/0270968 A1* | 11/2011 | Salsburg | G06F 9/5072 709/224 |
| 2011/0302412 A1* | 12/2011 | Deng | H04L 63/0407 713/155 |
| 2012/0005724 A1* | 1/2012 | Lee | H04L 63/0236 726/1 |
| 2012/0042170 A1* | 2/2012 | Curtin | G06F 21/77 713/185 |
| 2012/0072985 A1* | 3/2012 | Davne | H04L 67/10 709/225 |
| 2012/0140923 A1* | 6/2012 | Lee | H04L 9/0894 380/44 |
| 2012/0159148 A1* | 6/2012 | Behren | G06Q 20/3823 713/150 |
| 2012/0159178 A1* | 6/2012 | Lin | H04L 63/065 713/176 |
| 2012/0166807 A1* | 6/2012 | Shear | G06F 21/51 713/176 |
| 2012/0173877 A1* | 7/2012 | Pendakur | H04N 21/4408 713/169 |
| 2012/0179824 A1* | 7/2012 | Jackson | H04L 47/827 709/226 |
| 2012/0179902 A1* | 7/2012 | Noda | H04L 63/06 713/153 |
| 2012/0185913 A1* | 7/2012 | Martinez | G06F 9/45558 726/1 |
| 2012/0192283 A1* | 7/2012 | Gu | H04L 9/002 726/26 |
| 2012/0222084 A1* | 8/2012 | Beaty | G06F 11/3409 726/1 |
| 2012/0246487 A1* | 9/2012 | Gu | G06F 21/14 713/190 |
| 2012/0297200 A1* | 11/2012 | Thom | G06F 21/602 713/189 |
| 2012/0328106 A1* | 12/2012 | Dellow | G06F 21/73 380/283 |
| 2013/0073860 A1* | 3/2013 | Ibraimi | H04L 9/085 713/176 |
| 2013/0091353 A1* | 4/2013 | Zhang | H04L 9/3268 713/156 |
| 2013/0124862 A1* | 5/2013 | Pestoni | G06F 21/121 713/168 |
| 2013/0151848 A1* | 6/2013 | Baumann | H04L 9/3263 713/164 |
| 2013/0152180 A1* | 6/2013 | Nair | G06F 21/575 726/26 |
| 2013/0159730 A1* | 6/2013 | Asim | H04L 9/3073 713/189 |
| 2013/0166906 A1* | 6/2013 | Swaminathan | H04N 21/8456 713/162 |
| 2013/0166923 A1* | 6/2013 | Tsuhara | G06F 3/0605 713/193 |
| 2013/0212661 A1* | 8/2013 | Neafsey | H04L 63/08 726/6 |
| 2013/0318577 A1* | 11/2013 | Bulusu | H04W 12/08 726/5 |
| 2013/0322627 A1* | 12/2013 | Takashima | H04L 9/3255 380/255 |
| 2013/0346614 A1* | 12/2013 | Baughman | G06F 9/5083 709/226 |
| 2014/0003608 A1* | 1/2014 | MacMillan | H04L 9/3239 380/279 |
| 2014/0013109 A1* | 1/2014 | Yin | H04W 12/068 713/155 |
| 2014/0089658 A1* | 3/2014 | Raghuram | G06F 9/45533 380/278 |
| 2014/0095867 A1* | 4/2014 | Smith | H04L 63/0861 713/164 |
| 2014/0108805 A1* | 4/2014 | Smith | H04L 9/3247 713/176 |
| 2014/0129844 A1* | 5/2014 | Johnson | G06F 21/78 713/189 |
| 2014/0140504 A1* | 5/2014 | Karroumi | H04L 9/0861 380/44 |
| 2014/0140508 A1* | 5/2014 | Kamath | H04L 9/0822 380/255 |
| 2014/0164790 A1* | 6/2014 | Dodgson | G06Q 10/10 713/193 |
| 2014/0165128 A1* | 6/2014 | Auvenshine | H04L 63/1416 726/1 |
| 2014/0181518 A1* | 6/2014 | Kim | G06F 9/54 713/168 |
| 2014/0195690 A1* | 7/2014 | Harrison | H04L 67/141 709/227 |
| 2014/0195804 A1* | 7/2014 | Hursti | H04L 9/0863 713/168 |
| 2014/0195807 A1* | 7/2014 | Bar-El | H04L 9/0877 713/168 |
| 2014/0201218 A1* | 7/2014 | Catalano | H04L 47/803 707/748 |
| 2014/0229729 A1* | 8/2014 | Roth | H04L 67/1097 713/153 |
| 2014/0229732 A1* | 8/2014 | Roth | H04L 63/0428 713/167 |
| 2014/0229737 A1* | 8/2014 | Roth | H04L 9/0891 713/176 |
| 2014/0230007 A1* | 8/2014 | Roth | G06F 21/602 726/1 |
| 2014/0237239 A1* | 8/2014 | Hursti | H04L 9/32 713/168 |
| 2014/0237252 A1* | 8/2014 | Hursti | H04L 9/30 713/176 |
| 2014/0237255 A1* | 8/2014 | Martin | G06F 21/10 713/182 |
| 2014/0281481 A1* | 9/2014 | Moroney | H04N 21/26613 713/151 |

(56) References Cited

U.S. PATENT DOCUMENTS

| | | | | |
|---|---|---|---|---|
| 2014/0281483 A1* | 9/2014 | Vigliaturo | H04L 63/0471 | 713/153 |
| 2014/0289535 A1* | 9/2014 | Gan | H04L 9/32 | 713/189 |
| 2014/0321646 A1* | 10/2014 | Ksontini | H04L 63/0428 | 380/247 |
| 2014/0324480 A1* | 10/2014 | Dufel | G16H 10/60 | 705/3 |
| 2014/0359288 A1* | 12/2014 | Jensen | H04W 12/04 | 713/168 |
| 2014/0359289 A1* | 12/2014 | Camenisch | H04L 9/30 | 713/168 |
| 2014/0365763 A1* | 12/2014 | Manohar | G06F 21/53 | 713/156 |
| 2015/0026483 A1* | 1/2015 | Jiang | G06F 21/10 | 713/190 |
| 2015/0052358 A1* | 2/2015 | Udupi | H04L 9/0822 | 713/171 |
| 2015/0058629 A1* | 2/2015 | Yarvis | H04L 9/0825 | 713/171 |
| 2015/0088603 A1* | 3/2015 | Romero | G06Q 30/0201 | 705/7.29 |
| 2015/0089575 A1* | 3/2015 | Vepa | G06F 21/62 | 726/1 |
| 2015/0143117 A1* | 5/2015 | Freeman | H04L 67/1097 | 713/168 |
| 2015/0149772 A1* | 5/2015 | Leavy | H04L 63/06 | 713/168 |
| 2015/0150084 A1* | 5/2015 | Kiperberg | G06F 21/44 | 726/3 |
| 2015/0161382 A1* | 6/2015 | Boivie | G06K 19/06112 | 726/28 |
| 2015/0199528 A1* | 7/2015 | Bobinski | G06F 8/61 | 713/191 |
| 2015/0229471 A1* | 8/2015 | Nair | H04L 9/0891 | 713/171 |
| 2015/0242197 A1* | 8/2015 | Alfonso | G06F 8/65 | 717/173 |
| 2015/0248553 A1* | 9/2015 | Strand | G06F 21/45 | 726/6 |
| 2015/0248668 A1* | 9/2015 | Radu | G06Q 20/322 | 705/71 |
| 2015/0270951 A1* | 9/2015 | Michiels | H04L 63/1466 | 380/28 |
| 2015/0270956 A1* | 9/2015 | Basmov | G06F 21/74 | 713/189 |
| 2015/0278531 A1* | 10/2015 | Smith | H04L 63/0428 | 713/165 |
| 2015/0312223 A1* | 10/2015 | Michiels | G06F 21/51 | 713/168 |
| 2015/0332262 A1* | 11/2015 | Lingappa | G06Q 20/3823 | 705/71 |
| 2015/0381373 A1* | 12/2015 | Camenisch | H04L 9/3268 | 713/158 |
| 2016/0006724 A1* | 1/2016 | Vlot | G06F 21/72 | 713/156 |
| 2016/0036826 A1* | 2/2016 | Pogorelik | G06F 21/10 | 726/1 |
| 2016/0057619 A1* | 2/2016 | Lopez | G06Q 20/3829 | 380/247 |
| 2016/0063219 A1* | 3/2016 | Vlot | H04L 63/0464 | 713/168 |
| 2016/0080144 A1* | 3/2016 | Choi | H04L 9/0822 | 380/44 |
| 2016/0092696 A1* | 3/2016 | Guglani | G06F 21/606 | 726/26 |
| 2016/0125180 A1* | 5/2016 | Smith | H04L 9/0822 | 726/20 |
| 2016/0127351 A1* | 5/2016 | Smith | G06F 21/316 | 726/10 |
| 2016/0134623 A1* | 5/2016 | Roth | H04L 63/0823 | 713/156 |
| 2016/0164849 A1* | 6/2016 | Smith | H04L 67/1095 | 713/155 |
| 2016/0180066 A1* | 6/2016 | Michiels | H04L 9/0631 | 713/189 |
| 2016/0182227 A1* | 6/2016 | Michiels | H04L 9/06 | 380/28 |
| 2016/0182472 A1* | 6/2016 | Michiels | H04L 63/0876 | 713/171 |
| 2016/0182499 A1* | 6/2016 | Sharaga | G06F 21/82 | 713/156 |
| 2016/0191236 A1* | 6/2016 | Smirnoff | H04L 9/0822 | 713/171 |
| 2016/0205074 A1* | 7/2016 | Mitchell | H04L 9/0897 | 713/171 |
| 2016/0226661 A1* | 8/2016 | Keidar | H04L 9/3231 | |
| 2016/0234224 A1* | 8/2016 | Ashley | H04L 63/20 | |
| 2016/0261592 A1* | 9/2016 | Hubert | G06F 21/53 | |
| 2016/0269379 A1* | 9/2016 | Livesay | H04L 63/0861 | |
| 2016/0283731 A1* | 9/2016 | Chow | G06F 16/9027 | |
| 2016/0315917 A1* | 10/2016 | Smith | H04L 63/10 | |
| 2016/0321572 A9* | 11/2016 | Martinez | H04L 67/10 | |
| 2017/0033934 A1* | 2/2017 | Camenisch | H04L 9/3263 | |
| 2017/0034142 A1* | 2/2017 | Camenisch | H04L 9/3268 | |
| 2017/0048206 A1* | 2/2017 | Sui | H04L 63/0281 | |
| 2017/0063811 A1* | 3/2017 | Hitchcock | H04L 9/3234 | |
| 2017/0116438 A1* | 4/2017 | Ekberg | H04L 63/0876 | |
| 2017/0187524 A1* | 6/2017 | Furukawa | H04L 9/0844 | |
| 2017/0213027 A1* | 7/2017 | Gu | G06F 21/556 | |
| 2017/0228525 A1* | 8/2017 | Wajs | H04L 9/3226 | |
| 2017/0237551 A1* | 8/2017 | Van Foreest | G06F 21/10 | 713/189 |
| 2017/0243000 A1* | 8/2017 | Shraim | H04L 9/00 | |
| 2017/0286141 A1* | 10/2017 | Adler | G06F 9/4856 | |
| 2017/0288874 A1* | 10/2017 | Narendra Trivedi | G06F 9/45533 | |
| 2017/0310647 A1* | 10/2017 | Hu | G06F 21/33 | |
| 2017/0330402 A1* | 11/2017 | Menard | G07C 9/00857 | |
| 2017/0353451 A1* | 12/2017 | Metke | H04W 12/06 | |
| 2017/0359184 A1* | 12/2017 | Camenisch | H04L 63/0823 | |
| 2017/0373828 A1* | 12/2017 | Michiels | G06F 21/75 | |
| 2017/0374093 A1* | 12/2017 | Dhar | G06Q 50/265 | |
| 2017/0374101 A1* | 12/2017 | Woolward | H04L 63/0263 | |
| 2018/0150646 A1* | 5/2018 | Roth | H04L 63/20 | |
| 2018/0227241 A1* | 8/2018 | Halimi | H04L 67/306 | |
| 2018/0267830 A1* | 9/2018 | Rivera | G06F 9/5072 | |
| 2019/0020480 A1* | 1/2019 | Camenisch | H04L 9/3263 | |
| 2019/0095617 A1* | 3/2019 | Stefan | G06F 8/75 | |
| 2019/0158295 A1* | 5/2019 | Kinney | G06F 21/44 | |
| 2019/0305940 A1* | 10/2019 | Bhabbur | H04L 9/3226 | |
| 2019/0306194 A1* | 10/2019 | Benson | H04L 63/102 | |
| 2019/0312718 A1* | 10/2019 | Michiels | G06F 21/75 | |
| 2020/0004846 A1* | 1/2020 | Camenisch | H04L 9/3263 | |
| 2020/0044837 A1* | 2/2020 | Bos | H04W 12/041 | |
| 2020/0184090 A1* | 6/2020 | Grand | G06F 21/62 | |
| 2020/0211002 A1* | 7/2020 | Steinberg | G06Q 20/385 | |
| 2020/0327250 A1* | 10/2020 | Wang | G06N 20/00 | |
| 2021/0073034 A1* | 3/2021 | Bliesner | G06F 9/45558 | |
| 2021/0111884 A1* | 4/2021 | Nagao | H04L 9/3297 | |
| 2021/0234840 A1* | 7/2021 | Afshar | H04L 9/50 | |
| 2021/0271963 A1* | 9/2021 | Amisano | H04L 63/0428 | |
| 2021/0319436 A1* | 10/2021 | Ow | G06Q 20/0658 | |
| 2021/0390189 A1* | 12/2021 | Nagao | H04L 9/3247 | |
| 2021/0406939 A1* | 12/2021 | Moshkovich | G06F 16/215 | |
| 2022/0094536 A1* | 3/2022 | Nilsson | H04L 9/0894 | |
| 2022/0210195 A1* | 6/2022 | Parekh | H04L 63/20 | |
| 2022/0321357 A1* | 10/2022 | Omori | H04L 9/3263 | |
| 2023/0014473 A1* | 1/2023 | Grainger | H04L 9/3268 | |
| 2023/0073938 A1* | 3/2023 | Robinson-Morgan | H04L 9/50 | |
| 2023/0164143 A1* | 5/2023 | Richardson, IV | H04L 63/0876 | 726/6 |
| 2023/0177174 A1* | 6/2023 | Murdoch | G06F 21/31 | 726/18 |
| 2023/0179402 A1* | 6/2023 | Murdoch | G06F 21/44 | 713/171 |
| 2023/0179590 A1* | 6/2023 | Kim | H04L 9/3247 | 726/6 |
| 2023/0247060 A1* | 8/2023 | Geusz | H04L 63/08 | 726/1 |

(56) References Cited

U.S. PATENT DOCUMENTS

2023/0370283 A1* 11/2023 Chan .................. G06Q 20/3674
2023/0403154 A1* 12/2023 Kaizer ................. H04L 9/3218
2024/0129313 A1* 4/2024 Ankrom ................. G06F 21/32
2024/0323021 A1* 9/2024 de Kok .............. H04L 63/0421
2024/0330508 A1* 10/2024 Ankrom ................. G06F 21/31
2024/0419842 A1* 12/2024 Gonzalez Cervantes ...................
                                           G16H 10/60

* cited by examiner

FIG. 2

CREDENTIAL TO GUARANTEE IDENTITY

INTRODUCTION

A system, such as a medical system, can rely on pre-processors to collect and analyze private information to determine data quality of the private information.

SUMMARY

At least one aspect is directed to a system. The system can include one or more memory devices storing instructions thereon, that, when executed by one or more processors, cause the one or more processors to receive a selection of at least one type of private information of types of private information of a health provider from a computing system of the health provider. The instructions can cause the one or more processors to receive private information of the type from the computing system. The instructions can cause the one or more processors issue a credential that guarantees an identify of the health provider based on the type selected and a verification of the private information. The instructions can cause the one or more processors to add the credential to a credential store of the computing system, the credential store to verify the identity of the health provider with a plurality of applications.

The instructions can cause the one or more processors to generate a request to add the credential to a blockchain, the request including the credential and an address of the health provider. The instructions can cause the one or more processors to transmit the request to at least one node of a blockchain network to add the credential to the blockchain.

The instructions can cause the one or more processors to identify that the credential is expired or a requirement is breached. The instructions can cause the one or more processors to update the credential store to revoke the credential responsive to an identification that the credential is expired or the requirement is breached. The instructions can cause the one or more processors to push a notification that the credential is expired to at least one application that relied on the credential responsive to the identification that the credential is expired or the requirement is breached.

The instructions can cause the one or more processors to receive a request to extend the credential that guarantees the identify of the health provider. The instructions can cause the one or more processor to generate a second credential that guarantees the identity of the health provider. The instructions can cause the one or more processors to append the credential with the second credential in the credential store to maintain a credential history of the health provider.

The instructions can cause the one or more processors to receive an accountability request from an application responsive to the system of the health provider sending a request to the application to implement a service of the application. The instructions can cause the one or more processors to provide, responsive to a reception of the accountability request, the credential to the application. The instructions can cause the one or more processors to generate a second credential of a contract between the health provider and the application. The instructions can cause the one or more processors to append the second credential to the credential in the credential store.

The instructions can cause the one or more processors to verify the private information received from the system. The instructions can cause the one or more processors to generate an identify for the health provider of the system responsive to the verification of the private information. The instructions can cause the one or more processors to add the identity and the credential to the credential store.

The instructions can cause the one or more processors to add the credential to the credential store at a first point in time. The instructions can cause the one or more processors to generate credentials at multiple times after the first point in time. The instructions can cause the one or more processors to append the credentials to the credential store without removing existing credentials of the credential store to maintain a history of a reputation of the health provider.

The instructions can cause the one or more processors to perform an attestation algorithm or a zero-knowledge proof algorithm to verify the private information of the health provider. The instructions can cause the one or more processors to generate the credential responsive to the verification of the private information with the attestation algorithm or the zero-knowledge proof algorithm.

The instructions can cause the one or more processors to issue the credential to guarantee the identify of the health provider with the applications. The instructions can cause the one or more processors to issue a second credential to guarantee the identify of the health provider with only one application of the applications based on at least one requirement of the one application. The instructions can cause the one or more processors to add the second credential to the credential store.

The instructions can cause the one or more processors to tokenize the private information of the health provider to generate a plurality of tokens. The instructions can cause the one or more processors to transfer the tokens and the credential from the credential store of the health provider to a second credential store of a second health provider.

The instructions can cause the one or more processors to generate a value for the credential based on the selection of at least one type of private information. The value can indicate a level of verification of the private information and is based on an amount of the private information. The instructions can cause the one or more processors to add the value for the credential to the credential store. The instructions can cause the one or more processors to determine an adjustment to the value, the adjustment including an increase or a decrease to the value, adjust the value based on the adjustment, and add the adjusted value for the credential to the credential store.

The instructions can cause the one or more processors to determine, based on the type of the private information selected, a level of specificity of the private information. The instructions can cause the one or more processors to generate the credential based on the level of specificity of the type of the private information.

The instructions can cause the one or more processors to retrieve credentials of the health provider, including the credential, from the credential store. The instructions can cause the one or more processors to generate a history that indicates changes to the credentials of the health provider over time. The instructions can cause the one or more processors to provide the history to the computing system.

At least one aspect is directed to a method. The method can include receiving, by one or more processing circuits, a selection of at least one type of private information of types of private information of a health provider from a computing system of the health provider. The method can include receiving, by the one or more processing circuits, private information of the type from the computing system. The method can include issuing, by the one or more processing circuits, a credential that guarantees an identify of the health provider based on the type selected and a verification of the private information. The method can include adding, by the one or more processing circuits, the credential to a credential store of the computing system, the credential store to verify the identity of the health provider with applications.

The method can include generating, by the one or more processing circuits, a request to add the credential to a blockchain, the request including the credential and an address of the health provider. The method can include transmitting, by the one or more processing circuits, the request to at least one node of a blockchain network to add the credential to the blockchain.

The method can include identifying, by the one or more processing circuits, that the credential is expired or a requirement is breached. The method can include updating, by the one or more processing circuits, the credential store to revoke the credential responsive to an identification that the credential is expired or the requirement is breached. The method can include pushing, by the one or more processing circuits, a notification that the credential is expired to at least one application that relied on the credential responsive to the identification that the credential is expired or the requirement is breached.

The method can include receiving, by the one or more processing circuits, a request to extend the credential that guarantees the identify of the health provider. The method can include generating, by the one or more processing circuits, a second credential that guarantees the identity of the health provider. The method can include appending, by the one or more processing circuits, the credential with the second credential in the credential store to maintain a credential history of the health provider.

The method can include adding, by the one or more processing circuits, the credential to the credential store at a first point in time. The method can include generating, by the one or more processing circuits, credentials at times after the first point in time. The method can include appending, by the one or more processing circuits, the credentials to the credential store without removing existing credentials of the credential store to maintain a history of a reputation of the health provider.

The method can include performing, by the one or more processing circuits, an attestation algorithm or a zero-knowledge proof algorithm to verify the private information of the health provider. The method can include generating, by the one or more processing circuits, the credential responsive to the verification of the private information with the attestation algorithm or the zero-knowledge proof algorithm.

At least one aspect of the present disclosure is directed to one or more computer readable media storing instructions thereon that, when executed by one or more processors, cause the one or more processors to receive a selection of at least one type of private information of types of private information of a health provider from a computing system of the health provider. The instructions can cause the one or more processors to receive private information of the type from the computing system. The instructions can cause the one or more processors to issue a credential that guarantees an identify of the health provider based on the type selected and a verification of the private information. The instructions can cause the one or more processors to add the credential to a credential store of the computing system, the credential store to verify the identity of the health provider with applications.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 2 is an example flow diagram of registering a user.

DETAILED DESCRIPTION

Figure 1:
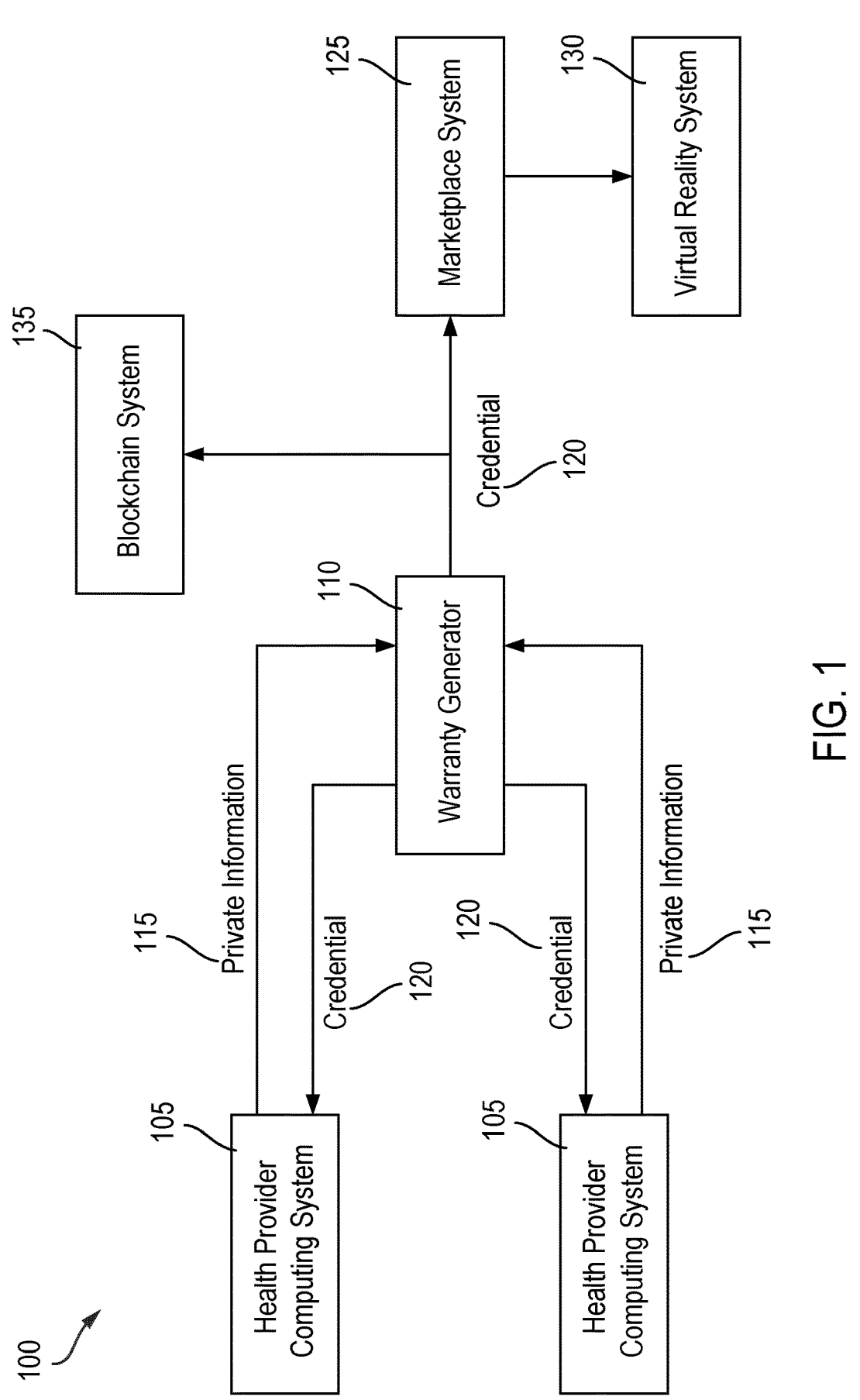
FIG. 1 is an example system that issues credentials that guarantee the identify of a user.

Following below are more detailed descriptions of various concepts related to, and implementations of, methods, apparatuses, and systems that generate and utilize credentials that guarantee identity. The various concepts introduced above and discussed in greater detail below may be implemented in any of numerous ways.

A data provider system can collect and sell or otherwise provide personal or private information of a user. For example, for a medical provider, such as a doctor, nurse, hospital, or care center, a data provider can search for, collect, and analyze data describing banking information, insurance information, medical residency information, education information, medical license information etc. and verify that the information is accurate. The data provider system can provide various levels of confidence for the authenticity of the data. Often, a computing system can rely on the corroboration of information from multiple data provider systems. However, the data of one data provider system may not be interoperable or reconcilable with data of other data provider systems, because each data provider system may operate with their own data formats or according to their own policies. Therefore, a computing system that relies upon the data of multiple data providers may require additional computing and memory resources, to collect, reconcile, and de-duplicate information received from multiple data providers. Furthermore, the computing system can implement one or more translation or integration layers to reconcile the information of different data providers.

Furthermore, an artificial intelligence (AI), such as a machine learning model or deep machine learning model, can create fake information about an entity. For example, the fake information can include fake videos, fake news articles, fake blog posts, fake insurance claim data, fake legal information, fake education data, or any other information that appears to be real but is AI generated and not actually authentic data. In this regard, the systems, such as data provider systems that collect information about an entity, can be overwhelmed by fake AI generated data. The data provider system can utilize significant amounts of processing resources, memory resources, and time to distinguish between fake data and real data. Even after running algorithms or models to discriminate between fake and real data, the data provider can still improperly classify a piece of fake information as real information. An AI system can overwhelm a data provider with fake information such that the AI system is not able to timely collect or verify information of an entity, and the reliability of the information is low.

Furthermore, having a data provider collect and aggregate information that is private can have security and privacy drawbacks. First, the entity may not want one or multiple different data providers aggregating their private information, and providing that private information to other entities, which can result in hacking attempts, account takeover attempts, etc. Furthermore, even if the data provider collects and aggregates the information, a system of the entity may still need to review and confirm that the data is authentic. As the data is communicated from system to system, the data can become vulnerable, and the potential for data corruption can arise.

To solve for these, and other technical issues, various example embodiments of the present disclosure provide technical solutions that can generate a certificate that guarantees identity. This system can enable self-servicing or self-warranty generation, where an entity can select and determine what private information the entity shares with a system that generates the warranty. In this regard, the private information can be self-reported by a user instead of, or in addition to, a pre-processor searching for and collecting the private information. In this regard, the entity can control what information is disclosed to the system, instead of having a data provider search for, collect, and process their private information.

This improves data privacy of the private information of the entity, giving the entity control over what private information is released to the system, and using significantly less processing resources, memory resources, and processing time compared to data provider systems. The system can generate a warranty for the entity based on the information provided by the entity. The warranty can be a credential, token, value store, or cryptographic key that guarantees the identity of the entity or the private information of the entity. The warranty can be secured via a blockchain system, for example, the credentials can be added to blocks of a blockchain to create an immutable record of a credential history of the entity. Furthermore, the warranty can be tokenized or a metaverse token, allowing the entity or another system to make token claims with other software applications, services, virtual reality or augmented reality systems. The system can provide an entry point and framework to provide warranty enabled data streams between systems to create a cascading layer of certainty and trust for transactions.

Referring now to FIG. 1, among others, an example system 100 that issues credentials that guarantee the identify of a user is shown. The system 100 can implement a credential that is a provable and transferable warranty for the identity or records of an entity. The system 100 can be implemented for business to business (B2B) or business to customer (B2C) ecosystems. The system 100 can be or include at least one or multiple computing systems, server systems, devices, apparatus, networks, hardware, or software. For example, each component of the system 100 can be an independent computing system or server system. One or multiple components of the system 100 can be combined and run on the same computing system or server system.

The system 100 can include at least one health provider computing system 105. The system 105 can be a computing device of a health provider, such as a doctor, nurse, hospital, hospice, care center, etc. The computing system 105 can be a laptop computer, a desktop computer, a smartphone, a cellphone, a tablet, or any other computing system or device. The computing system 105 can display a graphical user interface on a display device (LCD, LED, touch-screen, etc.) to a user. The user can select, via the graphical user interface, what type of sensitive or private information 115 to provide to a warranty generator 110. For example, the user can select different types of information from a variety of different types of information, for example, email addresses, names, phone numbers, addresses, work addresses, phone extensions, social security numbers, doctor residency information, medical or college degree information, age, date of birth, bank account information, insurance policy information, geographic location, etc.

The computing system 105 can transmit, send, push, provide, or communicate the private information 115 to the warranty generator 110. The computing system 105 can provide the private information 115 via a graphical user interface, a chat interface, a microphone, etc. The private information 115 can be self-reported data, e.g., the computing system 105 can decide whether and what private information 115 to provide to the warranty generator 110. The warranty generator 110 can perform identify proofing of a user or entity or maintain a reputational history of the user or entity. The warranty generator 110 can be a self-service module.

The system 100 can include at least one warranty generator 110. The warranty generator 110 can receive a selection of at least one type of private information 115 of multiple types of private information of a user from a computing system 105. For example, the warranty generator 110 can receive, from the health provider computing system 105, an indication of what types of information the user wants to provide, or is providing. For example, the warranty generator 110 can receive identifiers that specify what types of information are being provided. For example, for each piece of private information 115, a corresponding identifier can be received by the warranty generator 110. The corresponding identifier can indicate that a particular email address received is a type of email address, that a particular insurance number is an insurance number, etc. Furthermore, the warranty generator 110 can receive private information of the type selected by the computing system 105 from the computing system 105. For example, the private information 115 can be received by the warranty generator 110 separately from the private information 115 or along with the private information 115. During the process of generating the warranty, the computing system 105 may have the ability to limit certain sensitive or private information from being shared with the warranty generator 110 while still allowing relying parties to uphold compliance aspects required for business operations.

The warranty generator 110 can issue a credential 120. The warranty generator 110 can issue a credential 120 for each computing system 105. The warranty generator 110 can generate the credential 120 for the computing system 105. The warranty generator 110 can assign the credential 120 to the computing system 105. The credential 120 can guarantee or provide a warranty of the identify of the user or of the private information 115 of the user. The credential 120 can be or include a cryptographic file or piece of information that includes a digital signature. The credential 120 can be or include a token, such as a bearer token or access token that can be used to assert a claim. The credential 120 can be a single party or multi-party warranty that allows for one or multiple different systems or applications to rely on the credential 120 for the verification of the identify of the user of the computing system 105. The multi-party warranties can allow for convening forming activities, such as value-based care.

The warranty generator 110 can issue the credential 120 based on the type of the private information 115 selected or a verification of the private information 115. For example, the warranty generator 110 can determine to generate the credentials 120. The warranty generator 110 can determine not to generate the credential. The warranty generator 110 can determine what types of private information 115 the computing system 105 has selected to provide and what types of private information 115 that computing system 105 has selected to not provide. Each type of private information 115 can be weighted a particular amount or assigned a particular value. Responsive to the weight or score of the types of private information 115 satisfying a threshold (e.g., meeting or exceeding the threshold), the warranty generator 110 can issue the credential 120. Responsive to the weight or score of the types of private information 115 not satisfying a threshold (e.g., meeting or exceeding the threshold), the warranty generator 110 may not issue the credential 120.

The credential can be generated based on the specificity of the private information 115 provided by the computing system 105, not only on the accuracy of the private information 115. For example, the more specific private information 115 is, the higher score or weight can be provided to the private information. For example, a name of an insurance provider may have a first level of specificity, but an insurance policy number can have a second higher level of specificity. The warranty generator 110 can weight types of private information based on how closely the information identifies the user, e.g., how specific the information is to identifying the user. For example, the warranty generator 110 can determine, based on the type of the private information selected, a level of specificity of the private information 115. Certain types of information can be rated as having higher or lower levels of specificity. Based on the level of specificity for the types of information, the warranty generator 110 can generate the credential 120. For example, if a specificity level meets a threshold, the warranty generator 110 can generate the credential 120.

Instead of, or in addition to, generating quality values for the private information 115, the warranty generator 110 can analyze the type and accuracy of the private information 115 to determine whether to grant a warranty or deny granting a warranty, e.g., issue or not issue the credential 120. Instead of, or in addition to, outputting a quality of the private information 115, the warranty generator 110 can generate a binary indication to either issue the credential 120 or not issue the credential 120. The methodology for scoring the private information 115 and arriving at an indication of whether to issue or not issue the credential 120 can be stored by the warranty generator 110 as one or more instructions, human readable text, equations, etc. The methodology can be provided to the computing system 105, the marketplace system 125, or the virtual reality system 130. Users of the computing system 105, the marketplace system 125, or the virtual reality system 130 can review the methodology. For example, the marketplace system 125, in reviewing the methodology, can determine how much weight to give the credential 120. In some implementations, the marketplace system 125 can provide a unique scoring methodology to the warranty generator 110. The warranty generator 110 can implement the unique scoring methodology to determine whether to issue credentials 120 based on the private information 115. The credentials 120 issued based on the unique scoring methodology can be specific to the marketplace system 125. In some implementations, various applications or systems can each have their own scoring methodology, and the warranty generator 110 can generate a credential 120 for each application or system based on the scoring methodology for each application or system.

In some implementations, the marketplace system 125, the virtual reality system 130, or another system or application that utilizes the credential 120 can transmit commands or requests to the warranty generator 110. The request can be to extend the value of the credential 120. For example, the marketplace system 125 can collect additional data about the user that the warranty generator 110 can use to increase the confidence of the user being verified. For example, the virtual reality system 130 can collect usage data for the user, e.g., usage data for therapy, provable movements or activities, etc. The virtual reality system 130 can transmit the information collected for the user to the warranty generator 110. The warranty generator 110 can use the received virtual reality data to increase the confidence of the credential 120. Furthermore, the marketplace system 125, the virtual reality system 130, or another system or application, can transmit a command to revoke or extend the credential 120. For example, responsive to the warranty generator 110 receiving an indication that the user has violated one or more requirements, the warranty generator 110 can revoke the credential 120. The warranty generator 110 and the marketplace system 125 can provide a certainty layer that improves intended or discreet services.

The marketplace system 125 can be an application or service. The marketplace system 125 can connect health providers, such as doctors, nurses, nurse practitioners, therapists, psychologists, chiropractors, etc. (e.g., the various users or entities of the computing systems 105) with patients. The marketplace system 125 can maintain a list of health providers available in various regions, under various insurance plans or policies, etc. The marketplace system 125 can list a health provider in the marketplace system 125 responsive to validating the credential 120 for the health provider. If the marketplace system 125 determines that the credential is invalid or cannot be validated, the marketplace system 125 may not list a health provider in the marketplace, or may remove a listed health provider from the marketplace. The marketplace system 125 can use the credential 120 to verify the identify of the health providers to connect the health provider with patients for in-person treatments, therapies, surgeries, counseling, or other in person events. The marketplace system 125 can use the credential 120 to verify the identify of the health providers to connect the health provider with patients for virtual treatments (e.g., virtual treatments via the virtual reality system 130), such as therapy sessions, physical therapy, etc.

Furthermore, the warranty generator 110 can update the credential 120 over time. Updating the credential can include generating new credentials 120 and appending the new credentials to existing credentials 120. For example, as data confidences change, new private information 115 is provided by the user, supporting collateral information is received, the credential can be renewed or regenerated. The credentials 120 can be generated along with a confidence or warranty score. The credential 120 and the corresponding score can be stored together in a credential store. The score or weight can indicate a value of profile data or private information 115 provided by the computing system 105. The value can increase or decrease over time based on the specifications of the warranty generator 110. The value of the profile data can be increased or decreased based on the specifications of the warranty as determined by the warranty generator 110 that can self-describe actions recorded in a data ecosystem platform.

Furthermore, the warranty generator 110 can verify the private information received from the computing system 105. The warranty generator 110 may only issue or generate the credential responsive to the verification of the private information 115 and the weight or score exceeding or meeting the threshold. The computing system 105 can require that the private information 115 match, or exactly match, reference private information or truth data. For example, the warranty generator 110 can implement an attestation algorithm or a zero-knowledge proof algorithm to verify the private information 115. The warranty generator 110 can generate or issue the credential responsive to a verification of the private information 115 with the attestation algorithm or the zero-knowledge proof algorithm. Zero knowledge proofs or attestations can be used to generate a cryptographic proof.

The warranty generator 110 can generate the credential 120 to be or include an identifier, a hash, a token, a certificate, a digital signature, or any other cryptographic value or proof that provides a verification or guarantee of the identity or the private information 115 of the user. A system can verify the credential 120 via a cryptographic algorithm, and thus verify the identify of the user. The credential 120 can be, include, or be associated with one or multiple digital artifacts that show ownership of a credential 120. The artifacts can indicate that the credential 120 is owned by a particular user, and that the credential 120 verifies the identify of the user. The artifacts can further provide proof of authenticity of the credential 120. The credential 120 can be in a format or set of formats that are interoperable with other systems, enabling portability for application use cases as well as programmatically defining rules for how systems can utilize the credentials 120.

The warranty generator 110 can add credentials 120 to a credential store of the computing system 105. The credential store can be a digital wallet, a credential repository, a trusted platform module (TPM), or any other digital or hardware cryptographic or non-cryptographic data store. The credential store can store one or multiple credentials. The credential store can be completely or partially included or stored on the computing system 105. The credential store can be completely or partially included or stored on the warranty generator 110. Furthermore, the credential store can be included completely or partially on in a blockchain, and distributed across multiple nodes of a blockchain. For example, the credential 120 can be stored in a blockchain wallet, e.g., associated with one or more keys or addresses of the computing system 105 in the blockchain. The credential store can provide the credential 120 to verify the identify of the user with one or multiple different types of applications or services, e.g., the marketplace system 125, the virtual reality system 130, etc. The applications can perform at least one cryptographic algorithm or proof to verify the authenticity of the credential 120.

The credential 120 can be asserted to the applications as a token, such as a bearer token. Furthermore, pieces of the private information 115 can be tokenized and asserted to various applications, e.g., insurance details, work history details, residency details, education details, etc. can be tokenized and asserted as tokens to various applications, e.g., the marketplace system 125, the virtual reality system 130, etc.

The tokens can be private information that is transferrable between users or entities. For example, the tokens can be transferred from one credential store to another credential store. For example, for a doctor's office, multiple doctor's may have the same insurance policy or an insurance policy can be created for a specific position at the doctor's office. Information of the insurance policy, e.g., policy number, policy ending date, policy amounts, etc. can be transferred from one doctor's credential store to another doctor's credential store. Since the identify of a user can be established with a reputational perspective, the ownership of the data record can be tokenized and transferred to other users or entities. For example, the warranty generator 110 can determine that a target user or entity that is to receive ownership of the data record is verified via a warranty credential 120 or via their reputational history. Responsive to detecting that the target user or entity is verified, the credential 120, private information 115, or reputational history can be transferred, via tokens, to the target user or entity (e.g., to the credential store of the target user or entity).

The warranty generator 110 can generate the credentials 120 to be general credentials 120 that warranty the user to any application, or a group of applications. The warranty generator 110 can apply one or more criteria that meet a general type of credential 120 that the warranty generator 110 issues. The warranty generator 110 can generate the credentials 120 to be specific to a particular application, or a particular type of application. For example, an application can provide their own specific criteria, or a criteria can exist for a specific type of application (e.g., healthcare marketplace can be a first type, virtual reality can be a second type, etc.). For a user, the warranty generator 110 can generate a credential to guarantee the identity of the user with a group of applications.

The warranty generator 110 can generate or issue a general credential for the user, the general credential for the user to verify the user with the group of applications. The general credential can be generated or issued responsive to the private information 115 being verified and the amount and type of the private information 115 meeting one or more general requirements. The warranty generator 110 can add the general credential to a credential store of the computing system 105. The warranty generator 110 can generate or issue a specific credential for the user, the specific credential for the user to verify with one specific application, or applications of a specific type. The specific credential can be generated or issued responsive to the private information 115 being verified and the amount and type of the private information 115 meeting one or more specific requirements. The warranty generator 110 can add the specific credential to a credential store of the computing system 105. The general and specific credentials 120 can both be stored simultaneously, or at the same time, by the credential store of the computing system 105. In this regard, the credential warranties can be issued for regulatory or global use, and furthermore extensible niche purpose, which can solve peer to peer (P2P) interactions.

The warranty generator 110 can maintain a history of credentials 120. For example, the warranty generator 110 can generate or issue new credentials 120 over time as new private information 115 is collected, the private information 115 is verified to not have changed, insurance claims are made, etc. For example, the warranty generator 110 can generate a first credential 120 at a first point in time and add the first credential to the credential store. The warranty generator 110 can generate a second credential at a second point in time. The warranty generator 110 can add the second credential 120 to the credential store. The second credential 120 can be generated or issued after the first credential 120 is generated or issued. The second credential 120 can be appended to the first credential 120. The second credential 120 can be added to the credential store without removing any existing credentials 120 (e.g., the first credential) of the credential store to maintain a history of a reputation of the user. The warranty generator 110 can generate multiple different credentials 120 after one or multiple past credentials are generated. The warranty generator 110 can append the credentials 120 to the credential store. In this regard, the credentials 120 or warranties can be stackable. The number of stacked warranties for a particular user can be based on the applications that a user utilizes. For example, certain shopping or subscription actions of a computing system 105 can utilize different credentials 120. In this regard, the warranty generator 110 can receive an indication of the applications that the computing system 105 is requesting to access, and generate credentials 120 specific to the applications, and stack the credentials 120 on one single credential store (or spread the credentials 120 across multiple credential stores).

The warranty generator 110 can generate a value for each credential 120 based on the selection of at least one type of private information 115. The value can be generated by the warranty generator 110 to determine whether to generate the credential 120. The credential 120 can be added with the value to the credential store. The warranty generator 110 can determine to adjust or change the value, e.g., as new private information 115 is received. The warranty generator 110 can determine an adjustment to the credential 120. The adjustment can include an increase or a decrease to the value. The warranty generator 110 can adjust the value for the credential store based on the adjustment and add the adjusted value for the credential to the credential store. For example, the warranty generator 110 can generate a new value, and append the new value to the information of the credential store. In this regard, old or past values for the credential 120 may not change, and new values for the credential 120 are appended to create a history of values for the credential 120.

Because the credential store can maintain a reputational history of the user, the warranty generator 110 can generate a history of the user. The warranty generator 110 can append updates or corrections to records of the user to maintain a full reputational perspective for a user. The reputational perspective can be across a timespan. The timespan can be at least one day, week, month, year, decade, or century. The timespan can be at least six months and may not be episodic. For example, the reputational history for a medical provider, such as a doctor, can begin when a medical provider begins their residency at a hospital or care center.

The warranty generator 110 can generate a reputational history for a specific user. The warranty generator 110 can receive a request to generate a reputational history from a requesting system, e.g., the computing system 105, the blockchain system 135, the marketplace system 125, the virtual reality system 130. The warranty generator 110 can retrieve credentials or values from the credential store of a particular user. Based on the retrieved credentials, the warranty generator 110 can generate the history. The history can be a user interface, a report, or other data. The history can indicate different changes to the credentials of the user over time. The history can indicate when credentials were generated, when credentials were revoked, when credentials were renewed, scores or values generated for each credential, etc. The reputational history can include a current status of a credential 120, a trend of values for the credential 120, a percentage of time where the credential 120 was active, a percentage of time where the credential was inactive. The reputational history can be available to an entire ecosystem, e.g., to the marketplace system 125, such that data consumers and the profile owner themselves (e.g., the user) can see how the warranty has either improved or degraded through the actions of the profile owner and based on verified error reports. The reputational history can be provided to the requesting system responsive to the reputational history being generated.

The warranty generator 110 can add the credential 120 to a blockchain. For example, the warranty generator 110 can transmit a request to add the credential 120 to the blockchain to a blockchain system 135. The blockchain system 135 can be a node, or a collection or network of nodes that implement a blockchain. The warranty generator 110, in some implementations, can be a node of the blockchain network and can store and utilize a copy of a blockchain. The request that the warranty generator 110 generates can include the credential 120 and at least one identifier or cryptographic value of the user, such as a blockchain address, a public key, a seed, backup phrase, private key, etc. The warranty generator 110 can transmit the request to the blockchain system 135 (e.g., a node or set of nodes running a blockchain). The blockchain system 135 can add a block to the blockchain that includes the credential 120, a signature generated based on a private key of the user, an address of the user, etc. The blockchain system can implement any type of private or public blockchain.

The warranty generator 110 can implement auditing or testing of the credential 120. For example, the warranty generator 110 can receive a request from the computing system 105 or an application that the computing system 105 is attempting to access, to audit or test the credential 120. The warranty generator 110 can communicate with at least one third party system or device to audit the credential 120. The third party system can receive the private information 115 and the credential 120, and perform one or multiple analysis to audit the credential 120. The third party system can respond with an indication that the credential has passed or failed the audit. The warranty generator 110 can respond to the requesting system with an indication that the credential 120 passed or failed the audit. In some implementations, the computing system 105 or the application can directly request the third party system to perform the audit. The third party system can collect relevant information from the warranty generator 110, such as the private information 115 and/or the credential 120, and respond directly to the requesting system with the indication of whether the credential 120 has passed or failed the audit.

Figure 2:
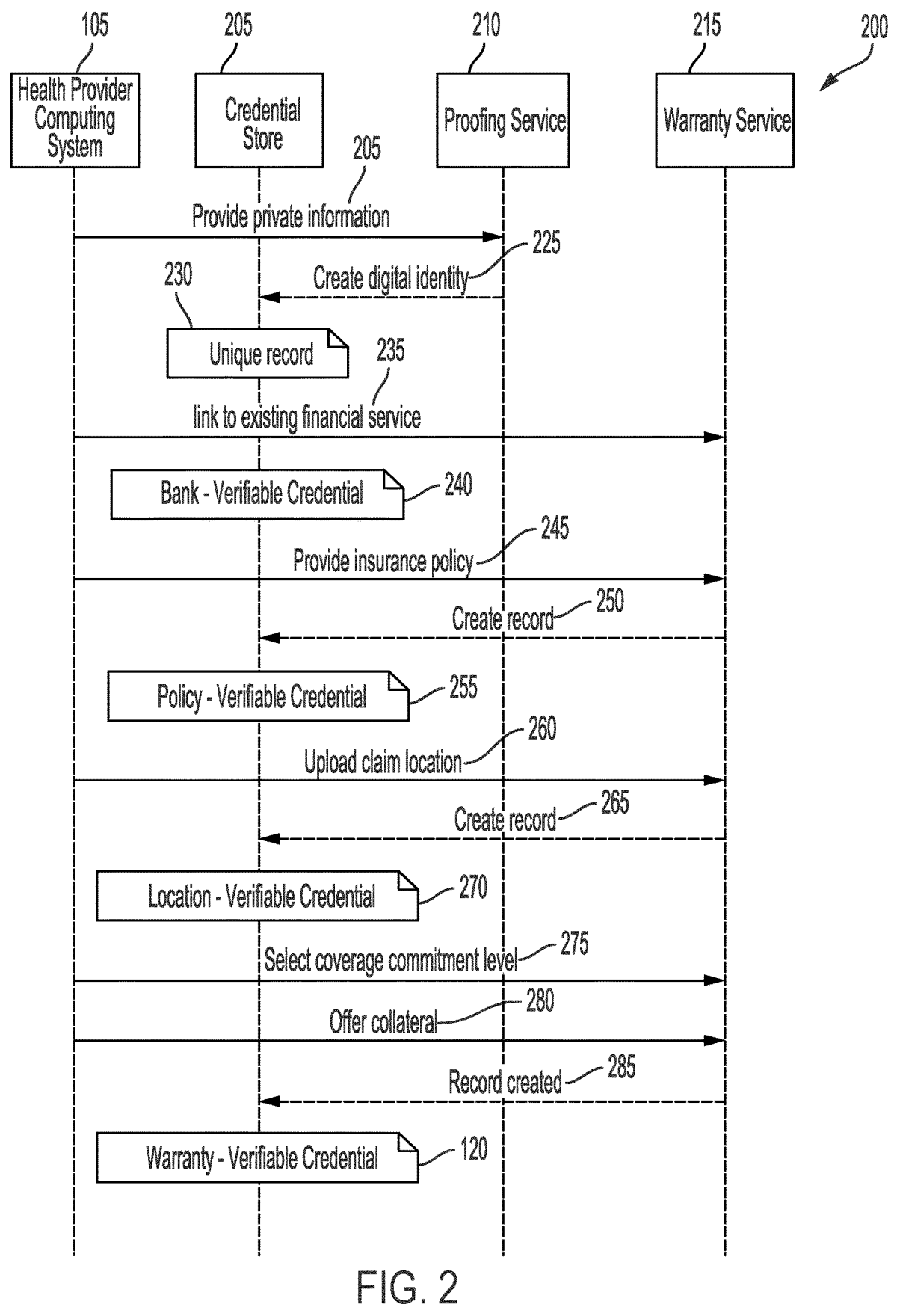

Referring now to FIG. 2, among others, a method 200 of registering a user is shown. At least a portion of the method 200 can be performed by the health provider computing system 105. At least a portion of the method 200 can be performed by a credential store 205. The credential store 205 can be a digital wallet, a credential repository, a trusted platform module (TPM), or any other digital or hardware cryptographic or non-cryptographic data store. The credential store can store one or multiple credentials. The credential store 205 can be completely or partially included or stored on the computing system 105. The credential store 205 can be completely or partially included or stored on the warranty generator 110. Furthermore, the credential store can be included completely or partially on a blockchain, and distributed across multiple nodes of a blockchain network. At least a portion of the method 200 can be performed by proofing service 210. At least a portion of the method 200 can be performed by warranty service 215. The proofing service 210 and the warranty service 215 can be software components, instructions, modules, or software entities of the warranty generator 110.

At ACT 220, the method 200 can include providing, by the computing system 105, the private information 115 to the proofing service 210. The computing system 105 can provide the private information 115 that proves the identity of the user of the computing system 105 or an entity associated with the computing system 105. The private information 115 can include a legal name, a social security number, a telephone number, a residential address, a business address, a drivers license number, biometric data, photo identification, or any other information.

At ACT 225, the method 200 can include creating, by the proofing service 210, a digital identify. The proofing service 210 can proof or verify the authenticity of the private information 115. The proofing service 210 can determine, based on the type and specificity of the information provided by the computing system 105, whether the user of the computing system 105 is verified. Responsive to verifying the user via the private information 115, the proofing service 210 can create the digital identify of the user. Creating the digital identity can include creating a unique record 230. The unique record 230 can be an identifier, private-public key pair, address, a credential, a password, a username, or other piece of information, including cryptographic data or non-cryptographic data, that uniquely identifies the user. The proofing service 210 can cause the unique record 230 to be created in the credential store 205 or added to or stored in the credential store 205. In some implementations, the proofing service 210 can create a new credential store 205 to store the unique record 230.

At ACT 235, the method 200 can include linking, by warranty service 215, to existing financial service. The computing system 105 can provide a link, bank credentials 240, passwords, etc. to the warranty service 215. The credentials 240 can allow the warranty service 215 to log into a bank or financial account of a user. The warranty service 215 can identify a level of financial assets, determine that the level of financial assets meets a threshold, etc. The warranty service 215 can generate the credential 120 responsive to the financial assets satisfying the threshold (e.g., exceeding the threshold).

At ACT 245, the method 200 can include providing, by the computing system 105, an insurance policy. The computing system 105 can provide an indication of a primary method or arrangement for paying claims. The data provided by the computing system 105 can include a policy number, a policy plan, a policy holder name or entity identification. The warranty service 215 can verify the insurance policy. For example, the warranty service 215 can transmit a request to a computing system of the insurance policy and verify that the insurance policy exists for the user. The warranty service 215 can transmit the data provided by the computing system 105 to verify that the insurance policy exists.

At ACT 250, the method 200 can include creating, by computing system 105, a record. The warranty service 215 can generate a policy credential 255. The credential 255 can be a verifiable credential that indicates that the insurance policy of the user is verified and authentic. The warranty service 215 can add or store the policy credential 255 in the credential store 205.

At ACT 260, the method 200 can include uploading, by the computing system 105, a claim location. The claim location can be a file or link. The claim location can indicate a location where a patient or other user can make an insurance claim. For example, the claim location can be a website or universal resource locator (URL) for a page where an insurance claim can be made. The claim location can be an email address, a phone number or a building address where an insurance claim can be made.

At ACT 265, the method 200 can include creating, by the warranty service 215, a record. The record can be a location credential 270. The location credential 270 can provide a confirmation that the location where patients can make an insurance claim has been provided and verified. The warranty service 215 can add or store the location credential 270 in the credential store 205.

At ACT 275, the method 200 can include selecting, by the computing system 105, a commitment level. A user, via the computing system 105, can specify a commitment level or a rating provided by the user guaranteeing that the insurance information provided is corrected and will be usable in the event of an insurance claim. The user can agree to provide periodic or timely updates to insurance. For example, the warranty service 215 can send a request, at a defined interval, to the computing system 105 prompting the user to confirm that the insurance details have not changed, or provide an update responsive to insurance details or insurance providers for the user changing. At ACT 280, the method 200 can include offering, by the computing system 105, collateral. The collateral can be identified as a financial asset, a vehicle, a car, a plane, a building, a house, etc. The collateral can provide programmatic accountability.

At ACT 285, the method 200 can create, by the warranty service 215, a record. The warranty service 215 can generate the credential 120. The warranty service 215 can generate the credential 120 responsive to a verification of the user and the private information 115 provided by the user. The more private information 115, or the more detailed the private information 115, the higher the warranty service 215 can weigh the information. For example, the higher the selected coverage commitment level or the high the collateral offered, the higher the warranty service 215 can weight the information. Responsive to a score or weight exceeding, meeting, or satisfying a threshold, the warranty service 215 can generate the credential 120.

Figure 3:
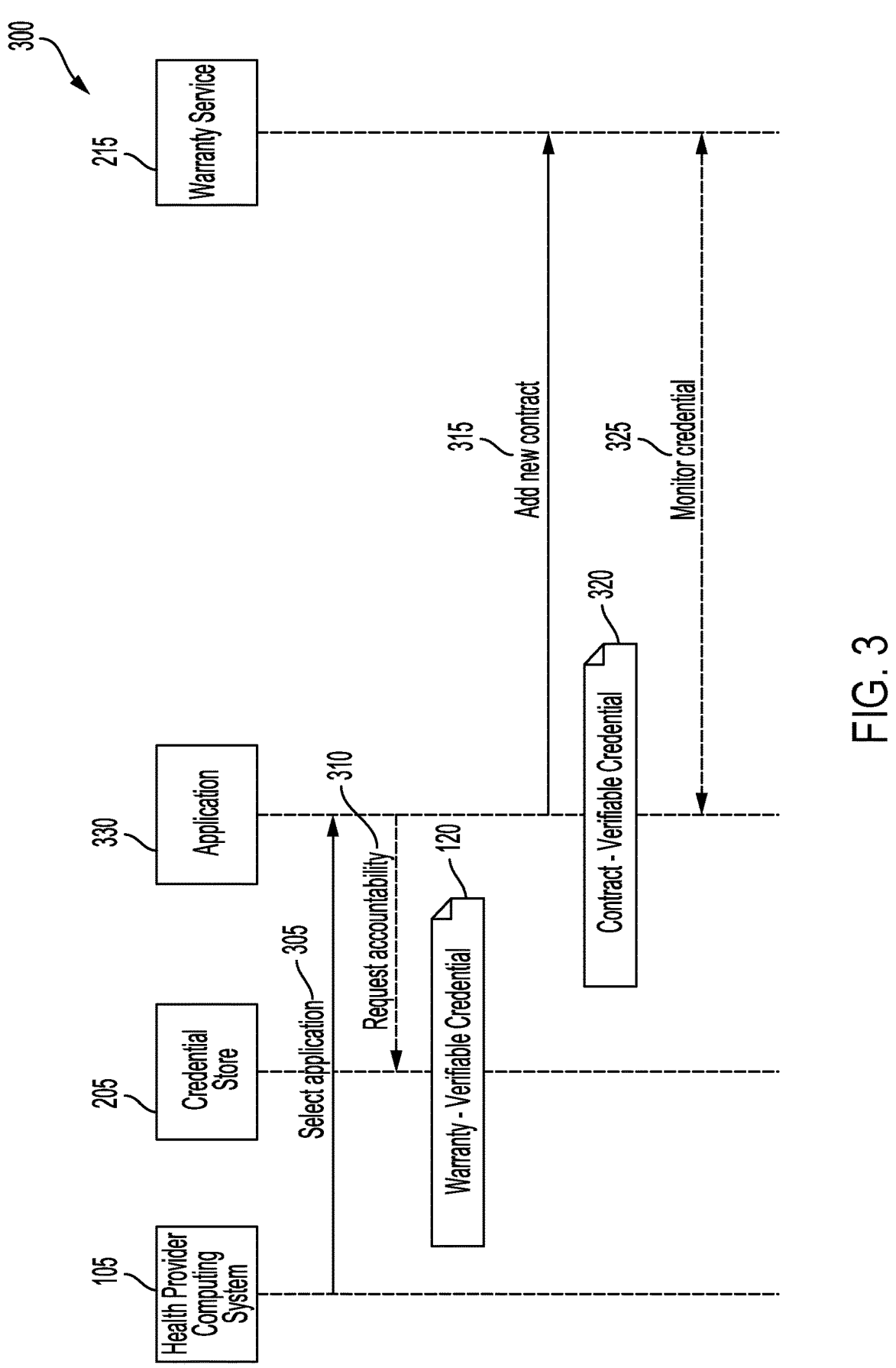
FIG. 3 is an example flow diagram of a user engaging with an application.

Referring now to FIG. 3, among others, a method 300 of a user engaging with an application is shown. At least a portion of the method 300 can be performed by the health provider computing system 105. At least a portion of the method 300 can be performed by the credential store 205. At least a portion of the method 300 can be performed by the warranty service 215. At least a portion of the method 300 can be performed by an application 330. The application 330 can be the marketplace system 125, the virtual reality system 130, or any other software application. The application 330 can be a software service that performs one or more operations to generate information or data to be displayed on the computing system 105.

At ACT 305, the method 300 can include selecting, by the computing system 105, the application 330. For example, the computing system 105 can select a service or application 330 and requires a level of certainty that the identity of the user of the computing system 105 is verified. For example, the application 330 can include a certainty layer or security layer that only allows the computing system 105 to utilize the application 330 responsive to the credential 120 being authenticated or verified, such that the identify of the user can be guaranteed.

At ACT 310, the method 300 can include requesting, by the application 330, accountability. For example, the credential store 205 can receive an accountability request from the application 330 responsive to a user, via the computing system 105, sending a request to the application 330 to implement the application 330 or a component or service of the application 330. The application 330 can transmit a request to the credential store. The request can be an accountability request, e.g., to verify that the identify of the user is verified, that the insurance provider of the user is verified, that a claim location is verified, etc. The request can be a request for the credential 120, the credential 255, or the credential 270. The credential store 205 can respond to the request with the credential 120. Furthermore, the credential store 205 can respond to the request with the credential 255 or the credential 270. The credential store 205 can provide, responsive to a reception of the accountability request, the credential to the application 330.

At ACT 315, the method 300 can include adding, by the application 330, a new contract. Adding the new contract can include linking to a view of a new contract or updating a new contract. The application 330 can generate a contract. The contract can be an operating agreement between the computing system 105 and the application 330 or between a user of the computing system 105 and the application 330. The contract can be generated as a credential 320. The application 330 can transmit a link to the credential 320 to the warranty service 215. In some implementations, the warranty service 215 generates the credential 320. The warranty service 215 can store the credential in the credential store 205. For example, the warranty service 215 can append the credential 320 to existing credentials in the credential store 205. The warranty service 215 can append the credential 320 to the credential 120.

At ACT 325, the method 300 can include monitoring, by the warranty service 215, at least one credential. The warranty service 215 and/or the application 330 can monitor the credential 320. For example, the warranty service 215 or the application 330 can collect and analyze data that indicates a credential expiration, a data breach, or an over extension of at least one policy. The warranty service 215 and the application 330 can determine whether the credential 320 has expired by determining that a predefined length of time has expired based on a current time indicated by a clock and a time at which the credential 320 was issued or a time at which the credential 320 is set to expire. Furthermore, the credential 320 can be revoked responsive to a detection of the computing system 105 utilizing the application 330 in an unauthorized manner, e.g., in a manner extending beyond a use policy for the application 330.

Figure 4:
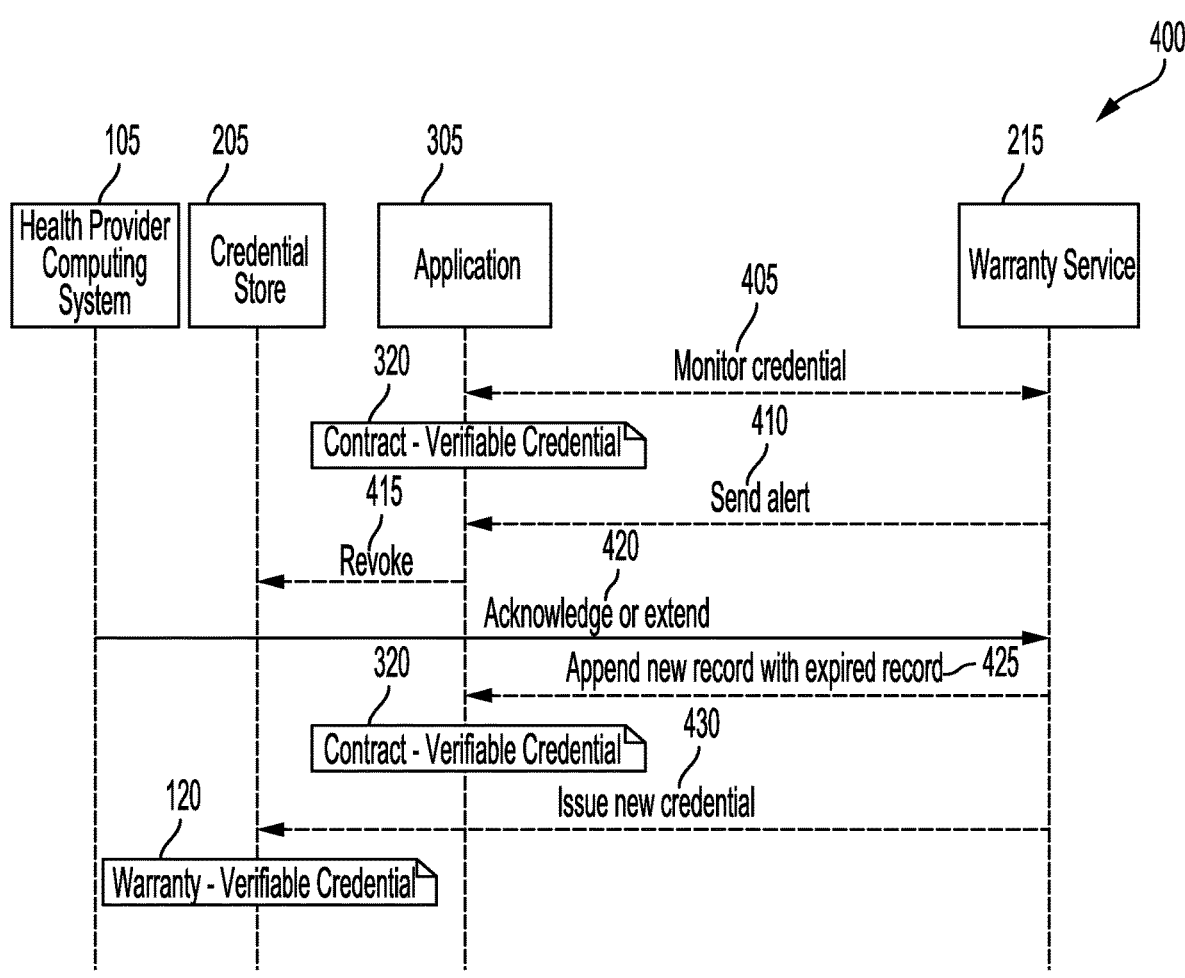
FIG. 4 is an example flow diagram of terminating a credential.

Referring now to FIG. 4, among others, a method 400 of terminating a credential is shown. At least a portion of the method 400 can be performed by the health provider computing system 105. At least a portion of the method 400 can be performed by the credential store 205. At least a portion of the method 400 can be performed by the warranty service 215. At least a portion of the method 400 can be performed by an application 330. The method 400 can include terminating credentials. Since the digital credentials or warranties issued by the warranty service 215 can be digital and programmatic, detected conditions such as an expiration or breach can cause a credential to be revoked and a particular application or party to receive notifications that a credential has been revoked. For example, a financial system can receive a notification to complete one or more prescribed financial operations. The warranties or credentials can follow computer based rules to reduce the probability of tampering or bad faith processing. Furthermore the warranties or credentials can be programmatically revoked and re-verified quickly.

At ACT 405, the method 400 can include monitoring, by the warranty service 215, a credential. The warranty service 215 can monitor the credential 120, the credential 270, the credential 255, or the credential 320. The warranty service 215 can monitor the credentials for expiration. The warranty service 215 can detect that a requirement is breached, such as a security breach to the computing system 105, the application 330, etc., The warranty service 215 can detect that private information of the user is exposed online. Furthermore, the warranty service can monitor the application 330 for new or enhanced software offerings.

At ACT 410, the method 400 can include sending, by the warranty service, an alert. Responsive to detecting a condition that the warranty service 215 identified at ACT 405, the warranty service 215 can send the alert to the application 330 at ACT 410. The alert can provide a notification to the application 330 that the credential is no longer valid or can no longer be relied upon. The notification can include at least one financial agreement. The alert can be a push notification that is pushed, without receiving a request for the notification, to an application 330. For example, the warranty service 215 can store a record of all applications that relied or utilized the credentials. Responsive to the credential being revoked or a condition being met to revoke the credential, the warranty service 215 can send push notifications to every application 330 that relied on the credential, as indicated by the history.

At ACT 415, the method 400 can include revoking, by application 330, a credential. The application 330 or the warranty service 215 can update the credential store 205 to revoke the credential responsive to an identification that the credential is expired or the requirement is breached. The application 330 or the warranty service 215 can transmit or send a message indicating that a specific credential should be revoked. For example, the message can identify that the credential 120, the credential 255, or the credential 270 should be revoked. The credential can be revoked by appending or adding an identifier or status indicating that a particular credential has been revoked. The identifier or status can be cryptographically signed to verify that the revocation is authentic. The revocation can be a piece of information or data appended or added to the credential store 205. The information can be added without deleting or removing the credential from being stored in the credential store 205.

At ACT 420, the method 400 can include acknowledging or extending, by the computing system 105 a credential. For example, the method 400 can include acknowledging or extending the credential responsive to the revocation. The computing system 105 can transmit a message acknowledging that the credential has been revoked. The computing system 105 can transmit a message to the warranty service 215 to extend the credential. For example, responsive to the warranty credential 120 expiring, the computing system 105 can transmit a request to extend the credential 120. The request can cause the warranty service 215 to re-verify the user. For example, the user may provide their information again to the warranty service 215, and the warranty service 215 can verify the information, and issue a new credential 120. The warranty service 215 can perform the steps of the method 200 to re-verify the user.

At ACT 425, the method 400 can include appending, by the warranty service 215, the expired record with a new record. For example, the warranty service 215 can generate a second credential after re-verifying the user. The second credential can guarantee the identify of the user, guarantee the insurance policy of the user, or guarantee the mechanism or location for making an insurance claim. The second credential can be added to the credential store 205 without deleting, removing, or overwriting the existing credentials of the credential store 205. For example, the second credential can be appended with or to existing credentials of the credential store 205. In this regard, the credential store 205 can store a historic record of all past and present credentials for a user.

At ACT 430, the method 400 can include issuing, by the warranty service 215, a new credential. The warranty service 215 can issue the new credential responsive to the user transmitting a request to extend a credential at ACT 420. For example, responsive to re-verifying the user and the private information 115 provided by the computing system 105, the warranty service 215 can generate a new credential 120 and transmit the new credential 120 to the credential store 205 for the credential store 205 to store or retain. The credential store 205 can receive the new credential 320 from the warranty service 215. The credential store 205 can append the new credential 320 to existing credentials of the credential store 205. For example, the credential store 205 can store a time stamp or time identifier that indicates the date and time when the new credential 120 was generated or added to the credential store 205.

Figure 5:
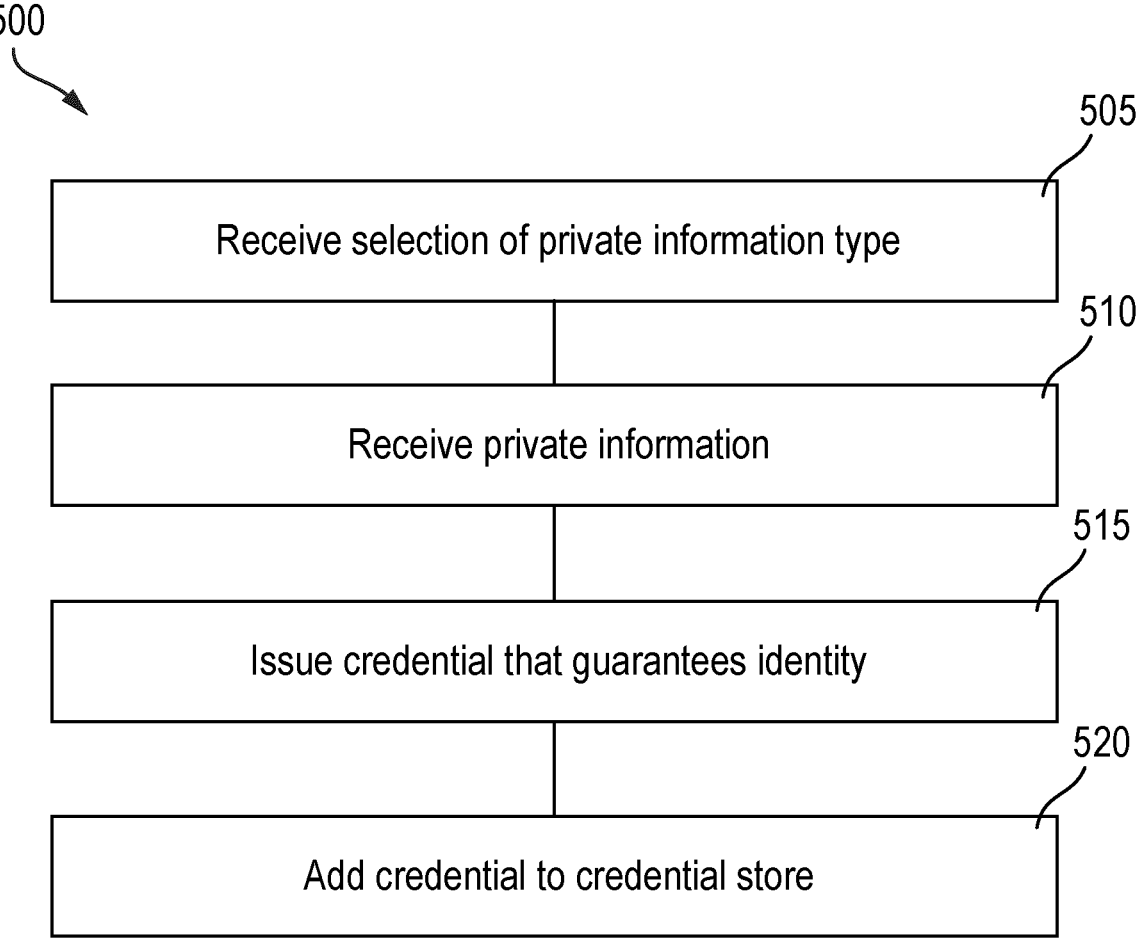
FIG. 5 is an example method of issuing a credential that guarantees the identify of a user.

Referring now to FIG. 5, among others, an example method 500 of issuing a credential that guarantees the identify of a user is shown. The method 500 can be performed, at least in part, by the computing system 105, the warranty generator 110, the blockchain system 135, the marketplace system 125, or the virtual reality system 130. Any computing system, server system, distributed processing system can perform the method 500. The method 500 can include an ACT 505 of receiving a selection of a private information type. The method 500 can include an ACT 510 of receiving private information. The method 500 can include an ACT 515 of issuing a credential that guarantees identity. The method 500 can include an ACT 520 of adding a credential to a credential store.

At ACT 505, the method 500 can include receiving, by the warranty generator 110, a selection of private information type. The warranty generator 110 can receive a selection of at least one private information type from the computing system 105. The computing system 105 can receive user input that identifies or specifies the types of private information that the user, such as a health provider, wishes to provide to the warranty generator 110. For example, the warranty generator 110 can generate data to cause a graphical user interface to be displayed on a display of the computing system 105. The graphical user interface can include graphical user interface elements that specify or identify different types of private information. The user can select, via the graphical user interface, at least one of the different types of private information to be provided to the warranty generator 110. The warranty generator 110 can receive a selection of the type of information that the user of the computing system 105 wishes to provide. The different types of information can include a name of the user, a residential address of the user, a business address of the user, a social security number of the user, an insurance provider name of the user, an insurance provider identifier of the user, an identifier of an insurance policy of the user, a link or address for a patient to make an insurance claim through the insurance policy of the user, etc.

At ACT 510, the method 500 can include receiving, by the warranty generator 110, the private information. The warranty generator 110 can receive the private information 115 from the computing system 105. The private information 115 can include a name of the user, a company that the user works for, a social security number of the user, an insurance provider of the user, an insurance policy number of the user, a hospital that the user works at, a medical license of the user, etc. The user can, via a graphical user interface, select which types of information that the user wishes to provide. For example, the warranty generator 110 can cause the graphical user interface to be displayed on the computing system 105 with indications of a set or group of different types of private information 115 that the warranty generator 110 accepts for verification for the user. The user, via the computing system 105, can provide indications to accept or reject each type of private information 115. The user, via the computing system 105 can provide the private information 115 for each accepted or selected type of private information 115.

At ACT 515, the method 500 can include issuing, by the warranty generator 110, the credential that guarantees identity. The warranty generator 110 can issue at least one credential 120. The credential 120 can guarantee that the identify of the user is verified. The credential 120 can guarantee that the insurance provider of the user is verified. The credential 120 can guarantee that the user has the medical license that the user claims to have, e.g., that the user is a doctor, a nurse, a nurse practitioner, a dentist, a surgeon, etc.

The warranty generator 110 can determine whether to issue the credential 120 or decline issuing the credential 120 based on the amount and type of private information 115 that the computing system 105 provides. Different types of private information can provide different levels of specificity in identifying the user. For example, a name of an insurance provider can provide a first level of specificity in identifying the user, while an insurance policy number can provide a second level of specificity greater than the first level of specificity in identifying the user. The different types of private information can provide various confidence levels in identifying the user. Each type of private information can have a weight or score associated with the private information. If an aggregate or summation of the weights or scores for different types of private information satisfies or exceeds a threshold, the warranty generator 110 can issue the credential 120. The warranty generator 110 can verify each piece of private information 115 provided, and only include those pieces of private information in the aggregate score responsive to a determination that the piece of information is verified.

At ACT 520, the method 500 can include adding, by the warranty generator 110, the credential to a credential store. For example, the warranty generator 110 can add the credential 120 to the credential store 205. For example, the warranty generator 110 can transmit the credential 120 to the credential store 205 to cause the credential store 205 to store and the credential 120. The credential store 205 can transmit the credential 120 to an application or system that the user wishes to interact with. For example, if the user wants to be listed in the marketplace run by the marketplace system 125, the credential store 205 can transmit the credential 120 to the marketplace system 125. Responsive to verifying the user via the credential 120, the marketplace system 125 can list the user in the marketplace.

In some implementations, the credential store 205 can be a blockchain database or system 135. The warranty generator 110 can add the credential 120 to a blockchain managed by the blockchain system 135. The warranty generator 110 can transmit the credential 120 to the blockchain along with an address, signature, or other identifier of the user or the computing system 105. The blockchain can store a block or record of the credential 120 along with the address, identifier, or signature associated with the user.

Figure 6:
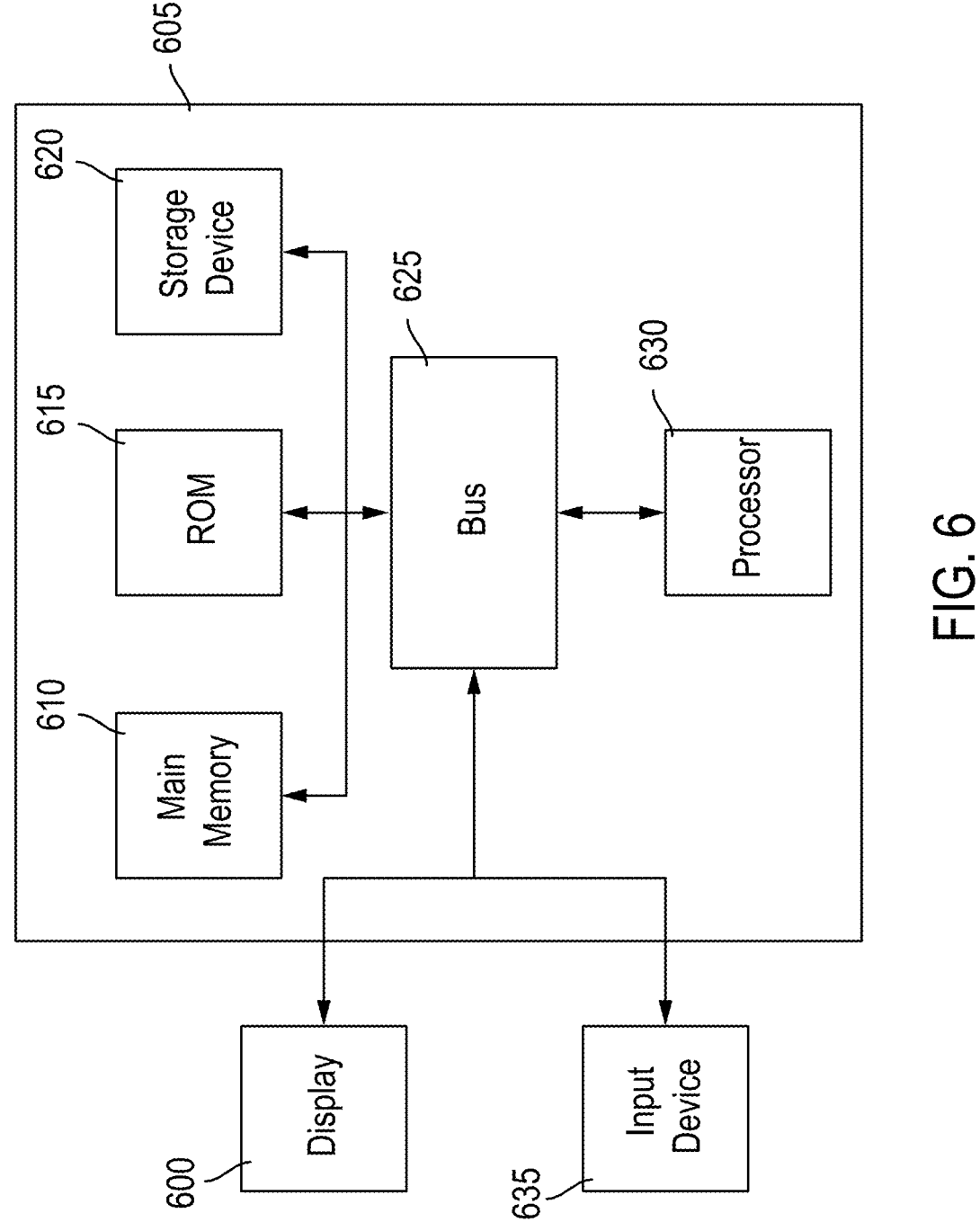
FIG. 6 is an example computing architecture of a data processing system.

Referring now to FIG. 6, among others, an example block diagram of a computing system 605 is shown. The computing system 605 can include or be used to implement a data processing system or its components. The architecture described in FIG. 6 can be used to implement the health provider computing system 105, the warranty generator 110, the blockchain system 135, the marketplace system 125, or the virtual reality system 130. The computing system 105 can include at least one bus 625 or other communication component for communicating information and at least one processor 630 or processing circuit coupled to the bus 625 for processing information. The computing system 105 can include one or more processors 630 or processing circuits coupled to the bus 625 for processing information. The computing system 105 can include at least one main memory 610, such as a random access memory (RAM) or other dynamic storage device, coupled to the bus 625 for storing information, and instructions to be executed by the processor 630. The main memory 610 can be used for storing information during execution of instructions by the processor 630. The computing system 605 can further include at least one read only memory (ROM) 615 or other static storage device coupled to the bus 625 for storing static information and instructions for the processor 630. A storage device 620, such as a solid state device, magnetic disk or optical disk, can be coupled to the bus 625 to persistently store information and instructions.

The computing system 605 can be coupled via the bus 625 to a display 600, such as a liquid crystal display, or active matrix display. The display 600 can display information to a user. An input device 635, such as a keyboard or voice interface can be coupled to the bus 625 for communicating information and commands to the processor 630. The input device 635 can include a touch screen of the display 600. The input device 635 can include a cursor control, such as a mouse, a trackball, or cursor direction keys, for communicating direction information and command selections to the processor 630 and for controlling cursor movement on the display 600.

The processes, systems and methods described herein can be implemented by the computing system 605 in response to the processor 630 executing an arrangement of instructions contained in main memory 610. Such instructions can be read into main memory 610 from another computer-readable medium, such as the storage device 620. Execution of the arrangement of instructions contained in main memory 610 causes the data computing system 605 to perform the illustrative processes described herein. One or more processors in a multi-processing arrangement can be employed to execute the instructions contained in main memory 610. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or example, and references to "an implementation," "some implementations," "one implementation" or the like are not necessarily mutually exclusive and are intended to indicate that a particular feature, structure, or characteristic described in connection with the implementation may be included in at least one implementation or example. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

What is claimed is:

1. A system, comprising:
one or more memory devices storing instructions thereon, that, when executed by one or more processors, cause the one or more processors to:
    generate a graphical user interface including a plurality of types of private information describing health providers accepted for verifying identities of the health providers for a plurality of healthcare applications;
    receive, via the graphical user interface, a selection of at least one type of private information of the plurality of types of private information of a health provider from a computing system of the health provider to use to verify an identity of the health provider;
    receive private information of the type from the computing system;
    issue a credential that verifies an identity of the health provider based on the type selected and a verification of the private information of the health provider; and
    add the credential to a credential store of the computing system, the credential store to verify the identity of the health provider with the plurality of healthcare applications.

2. The system of claim 1, wherein the instructions cause the one or more processors to:
generate a request to add the credential to a blockchain, the request comprising the credential and an address of the health provider; and
transmit the request to at least one node of a blockchain network to add the credential to the blockchain.

3. The system of claim 1, wherein the instructions cause the one or more processors to:
identify that the credential is expired or a requirement is breached;
update the credential store to revoke the credential responsive to an identification that the credential is expired or the requirement is breached; and
push a notification that the credential is expired to at least one application that relied on the credential responsive to the identification that the credential is expired or the requirement is breached.

4. The system of claim 1, wherein the instructions cause the one or more processors to:
receive a request to extend the credential that verifies the identity of the health provider;
generate a second credential that verifies the identity of the health provider;
append the credential with the second credential in the credential store to maintain a credential history of the health provider.

5. The system of claim 1, wherein the instructions cause the one or more processors to:
receive an accountability request from an application responsive to the system of the health provider sending a request to the application to implement a service of the application;
provide, responsive to a reception of the accountability request, the credential to the application;
generate a second credential of a contract between the health provider and the application; and
append the second credential to the credential in the credential store.

6. The system of claim 1, wherein the instructions cause the one or more processors to:
verify the private information received from the system;
generate an identifier for the health provider of the system responsive to the verification of the private information; and
add the identifier and the credential to the credential store.

7. The system of claim 1, wherein the instructions cause the one or more processors to:
add the credential to the credential store at a first point in time;
generate a plurality of credentials at a plurality of times after the first point in time; and
append the plurality of credentials to the credential store without removing existing credentials of the credential store to maintain a history of a reputation of the health provider.

8. The system of claim 1, wherein the instructions cause the one or more processors to:
perform an attestation algorithm or a zero-knowledge proof algorithm to verify the private information of the health provider; and
generate the credential responsive to the verification of the private information with the attestation algorithm or the zero-knowledge proof algorithm.

9. The system of claim 1, wherein the instructions cause the one or more processors to:
issue the credential to verify the identity of the health provider with the plurality of healthcare applications;
issue a second credential to verify the identity of the health provider with only one application of the plurality of healthcare applications based on at least one requirement of the one application; and
add the second credential to the credential store.

10. The system of claim 1, wherein the instructions cause the one or more processors to:
tokenize the private information of the health provider to generate a plurality of tokens; and
transfer the plurality of tokens and the credential from the credential store of the health provider to a second credential store of a second health provider.

11. The system of claim 1, wherein the instructions cause the one or more processors to:
generate a value for the credential based on the selection of at least one type of private information, wherein the value indicates a level of verification of the private information and is based on an amount of the private information;

add the value for the credential to the credential store;

determine an adjustment to the value, the adjustment comprising an increase or a decrease to the value;

adjust the value based on the adjustment; and add the adjusted value for the credential to the credential store.

12. The system of claim 1, wherein the instructions cause the one or more processors to:

determine, based on the type of the private information selected, a level of specificity of the private information; and generate the credential based on the level of specificity of the type of the private information.

13. The system of claim 1, wherein the instructions cause the one or more processors to:

retrieve a plurality of credentials of the health provider, comprising the credential, from the credential store;

generate a history that indicates changes to the plurality of credentials of the health provider over time; and provide the history to the computing system.

14. A method, comprising:

generating, by one or more processing circuits, a graphical user interface including a plurality of types of private information describing health providers accepted for verifying identities of the health providers for a plurality of healthcare applications;

receiving, via the graphical user interface, by the one or more processing circuits, a selection of at least one type of private information of the plurality of types of private information of a health provider from a computing system of the health provider to use to verify an identity of the health provider;

receiving, by the one or more processing circuits, private information of the type from the computing system;

issuing, by the one or more processing circuits, a credential that verifies an identity of the health provider based on the type selected and a verification of the private information of the health provider; and adding, by the one or more processing circuits, the credential to a credential store of the computing system, the credential store to verify the identity of the health provider with the plurality of healthcare applications.

15. The method of claim 14, comprising:

generating, by the one or more processing circuits, a request to add the credential to a blockchain, the request comprising the credential and an address of the health provider; and transmitting, by the one or more processing circuits, the request to at least one node of a blockchain network to add the credential to the blockchain.

16. The method of claim 14, comprising:

identifying, by the one or more processing circuits, that the credential is expired or a requirement is breached;

updating, by the one or more processing circuits, the credential store to revoke the credential responsive to an identification that the credential is expired or the requirement is breached; and pushing, by the one or more processing circuits, a notification that the credential is expired to at least one application that relied on the credential responsive to the identification that the credential is expired or the requirement is breached.

17. The method of claim 14, comprising:

receiving, by the one or more processing circuits, a request to extend the credential that verifies the identity of the health provider;

generating, by the one or more processing circuits, a second credential that verifies the identity of the health provider; and appending, by the one or more processing circuits, the credential with the second credential in the credential store to maintain a credential history of the health provider.

18. The method of claim 14, comprising:

adding, by the one or more processing circuits, the credential to the credential store at a first point in time;

generating, by the one or more processing circuits, a plurality of credentials at a plurality of times after the first point in time; and appending, by the one or more processing circuits, the plurality of credentials to the credential store without removing existing credentials of the credential store to maintain a history of a reputation of the health provider.

19. The method of claim 14, comprising:

performing, by the one or more processing circuits, an attestation algorithm or a zero-knowledge proof algorithm to verify the private information of the health provider; and generating, by the one or more processing circuits, the credential responsive to the verification of the private information with the attestation algorithm or the zero-knowledge proof algorithm.

20. One or more computer readable media storing instructions thereon that, when executed by one or more processors, cause the one or more processors to:

generate a graphical user interface including a plurality of types of private information describing health providers accepted for verifying identities of the health providers for a plurality of healthcare applications;

receive, via the graphical user interface, a selection of at least one type of private information of the plurality of types of private information of a health provider from a computing system of the health provider to use to verify an identity of the health provider;

receive private information of the type from the computing system;

issue a credential that verifies an identity of the health provider based on the type selected and a verification of the private information of the health provider; and add the credential to a credential store of the computing system, the credential store to verify the identity of the health provider with the plurality of healthcare applications.

* * * * *